United States Patent
Deng et al.

(10) Patent No.: US 12,333,397 B1
(45) Date of Patent: Jun. 17, 2025

(54) SYSTEMS AND METHODS FOR INCORPORATING SUPPLEMENTAL SHAPE INFORMATION IN A SUPPORT VECTOR MACHINE

(71) Applicant: Wells Fargo Bank, N.A., San Francisco, CA (US)

(72) Inventors: Geng Deng, McLean, VA (US); Yaoguo Xie, Charlotte, NC (US); Xindong Wang, Dayton, MD (US); Qiang Fu, McLean, VA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1174 days.

(21) Appl. No.: 17/164,405

(22) Filed: Feb. 1, 2021

(51) Int. Cl.
  *G06N 20/10* (2019.01)
  *G06F 18/211* (2023.01)
  *G06F 18/2411* (2023.01)
  *G06F 18/2431* (2023.01)
  *G06F 18/25* (2023.01)

(52) U.S. Cl.
  CPC ........... *G06N 20/10* (2019.01); *G06F 18/211* (2023.01); *G06F 18/2411* (2023.01); *G06F 18/2431* (2023.01); *G06F 18/25* (2023.01)

(58) Field of Classification Search
  CPC ... G06N 20/10; G06F 18/211; G06F 18/2411; G06F 18/2431; G06F 18/25
  See application file for complete search history.

(56) References Cited

U.S. PATENT DOCUMENTS

| | | | | |
|---|---|---|---|---|
| 7,346,736 | B1* | 3/2008 | Gluhovsky | G06F 12/0802 711/134 |
| 8,135,652 | B2* | 3/2012 | Graf | G06F 18/254 706/12 |
| 2003/0078683 | A1* | 4/2003 | Hartman | G06F 18/214 700/52 |
| 2003/0101161 | A1* | 5/2003 | Ferguson | G05B 13/0265 |
| 2017/0068846 | A1* | 3/2017 | Linguraru | G06V 40/174 |
| 2020/0150305 | A1* | 5/2020 | Guevara Diaz | G01V 1/22 |

(Continued)

OTHER PUBLICATIONS

C. Bartley, W. Liu and M. Reynolds, Effective monotone knowledge integration in kernel support vector machine. In Proceeding of the 12th International Conference on Advanced Data Mining and Application, pp. 3-18. Springer, 2016.

(Continued)

*Primary Examiner* — Phenuel S Salomon
(74) *Attorney, Agent, or Firm* — K&L Gates LLP

(57) ABSTRACT

Systems, apparatuses, methods, and computer program products are disclosed for training and utilizing a shape-restricted support vector machine (SR-SVM). An example method includes receiving a training dataset, and selecting, by a training engine, a set of shape restrictions, the set of shape restrictions including a shape restriction for each feature in the training dataset. The example method further includes training, by the training engine, the SR-SVM using the training dataset and the selected set of shape restrictions, wherein training the SR-SVM produces a shape-restricted hyperplane that defines a decision boundary separating a first class of data points in the training dataset from a second class of data points in the training dataset. The trained SR-SVM may then be utilized in a number of ways.

18 Claims, 13 Drawing Sheets

(56) References Cited

U.S. PATENT DOCUMENTS

2022/0318641 A1* 10/2022 Carreira-Perpiñán .................. G06N 20/20
2023/0351731 A1* 11/2023 Stadelmann .......... G06V 20/698

OTHER PUBLICATIONS

A. Ben-David, L. Sterling, and Y.H. Pao, Learning and classification of monotonic ordinal concepts. Comput. Intell., 5:45-49, 1989.

M.J. Best and N. Chakravarti, Active set algorithms for isotonic regression; a unifying framework. Mathematical Programming, 47:425-439, 1990.

J. Ramon Cano, P.A. Gutierrez, B Krawczyk, M. Wozniak, and S. Gracia, Mono-tonic classification: an overview on algorithms, performance measures and data sets. Arxiv.org, abs/1811.07115, 2018.

C.Chen and S.T. Li, Credit rating with a monotonicity-constrained support vector machine model. Expert Systems with Applications, 41(16):7235-7247, 2014.

Y.Chen and R.J. Samworth, Generalized additive and index models with shape constraints. Journal of Royal Statistical Society, Series B, 78(4):729-754, 2016.

C. Cortes and V. Vapnik. Support-vector networks. Machine learning, 20(3):273-297, 1995.

H. Daniels and M. Velikova, Monotone and partially monotone neural networks. IEEE Transactions on Neural Networks, 21(6):906-917, 2010.

W. Duivesteijn and A. Feelders, Nearest neighbor classification with monotonicity constraints. ECML/PKDD Lecture Notes in Computer Science, 5211:301-316, 2008.

Y. Freund and R.E. Schapier, A decision-theoretic generalization of on-line learning and an application to boosting. Journal of Computer and System Sciences, 55:119-139, 1997.

P. Gutierrez, M. Perez-Ortiz, J. Sanchez-Monedero, F. Fernandez-Navarro, and C. Hervas-Martnez, Ordinal regression methods: survey and experimental study. IEEE Transactions on Knowledge and Data Engineering, 28(1):127-146, 2015.

M. Hall, E. Frank, G. Holmes, B. Pfahringer, P. Reutemann, and I. Witten, The weka data mining softwre: an update. ACM SIGKDD explorations newsletter, 11(1):10-18, 2009.

W. Kotlowski and R. Slowinski, On nonparametric ordinal classification with monotonicity constraints. 25(11):2576-2589, 2012.

S.-T. Li and C.-C. Chen, Regularized monotonic fuzzy support vector machine model for data mining with prior knowledge. IEE Transactions on Fuzzy Systems, 25(5):1713-1727, 2015.

R. Potharst and A.J. Feelders, Classification trees for problems with monotonicity constraints. ACM SIGKDD Explorations Newsletter, 4(1):1-10, 2002.

Y. Qian, H. Xu, J. Liang, and J. Wang G. Liu, fusing monotonic decision trees. IEEE Transactions on Knowledge and Data Engineering, 27(10):2717-2728, 2015.

Q. Yang and X. Wu, 10 challenging problems in data mining research, International Journal of Information Technology & Decision Making, 5(4):597-604, 2006.

\* cited by examiner

SYSTEMS AND METHODS FOR INCORPORATING SUPPLEMENTAL SHAPE INFORMATION IN A SUPPORT VECTOR MACHINE

TECHNOLOGICAL FIELD

Example embodiments of the present disclosure relate generally to computer-aided classification and, more particularly, to systems and methods for training and using a shape-restricted support vector machine that incorporates component-wise shape information to enhance classification accuracy.

BACKGROUND

Classification is a fundamental supervised learning tool for predictive knowledge discovery. A Support Vector Machine (SVM) is a canonical supervised learning model that can be applied to classification and regression analysis. Although SVM was invented in 1995, it is a powerful tool and still widely used today as a standard machine learning technique. SVM is motivated by the idea of constructing a hyperplane to separate one data class from another. The traditional SVM is a linear SVM that constructs a linear separating hyperplane, while a more advanced parametric kernel transformation results in nonlinear hyperplanes.

BRIEF SUMMARY

Existing SVMs are limited to parametric formulations and do not take underlying shape constraints. However, real world problems commonly exhibit underlying shape restricted relationships including monotonicity and convexity/concavity between input and target. This relationship provides valuable information in predictive modeling; nevertheless, conventional classifiers generally lack the functionality to utilize this prior information in order to improve prediction accuracy and model interpretability. Among all types of shape information, monotonicity is the most commonly encountered. For instance, in credit scoring problems, a higher FICO score implies a lower default probability; thus, assuming other features to be identical, a classifier should predict lower default probability given higher FICO scores. This is an example of monotonic or ordinal classification. Without a monotonicity constraint, conventional classifiers could potentially overfit to data and yield counter-intuitive outputs. How to integrate complex knowledge into data mining is regarded as one of the 10 challenging problems in machine learning research. Q. Yang and X. Wu. 10 challenging problems in data mining research. *International Journal of Information Technology & Decision Making*, 5(4): 597-604, 2006.

As noted above, many classification problems contain shape information from input features, such as monotonicity, convexity, and concavity. Described herein is a new classifier, called a Shape-Restricted Support Vector Machine (SR-SVM), which takes component-wise shape information into account to enhance classification accuracy. While standard SVMs use linear separating hyperplanes, the SR-SVM disclosed herein essentially may construct non-parametric and nonlinear separating planes subject to component-wise shape restrictions. As described below, the SR-SVM classifier may be formulated as a convex optimization problem and solved using an active-set algorithm. This approach applies basis function expansions on the input and effectively utilizes an SVM solver. As illustrated below, the SR-SVM demonstrates improved classification performance by taking into account this additional shape information for a given input.

Systems, apparatuses, methods, and computer program products are disclosed herein for training an SR-SVM. In one example embodiment, a system is provided for training an SR-SVM. The system includes processing circuitry or input-output circuitry for receiving a training dataset. The system further includes a training engine for selecting a set of shape restrictions corresponding to the features of the training dataset, and for training the SR-SVM using the training dataset and the selected set of shape restrictions. Training the SR-SVM produces a shape-restricted hyperplane that defines a decision boundary separating a first class of data points in the training dataset from a second class of data points in the training dataset. Following training of the SR-SVM, the system may output the trained SR-SVM, classify one or more data points using the trained SR-SVM, or identify a subset of "critical" knots identified during the training procedure.

In another example embodiment, a method is provided for training an SR-SVM. The method includes receiving a training dataset, and selecting, by a training engine, a set of shape restrictions, the set of shape restrictions including a shape restriction for each feature in the training dataset. The method further includes training, by the training engine, the SR-SVM using the training dataset and the selected set of shape restrictions to produces a shape-restricted hyperplane that defines a decision boundary separating a first class of data points in the training dataset from a second class of data points in the training dataset.

In another example embodiment, a computer program product is provided for training an SR-SVM. The computer program product includes at least one non-transitory computer-readable storage medium storing software instructions that, when executed, cause an apparatus to receive a training dataset, select a set of shape restrictions, and train the SR-SVM using the training dataset and the selected set of shape restrictions to produces a shape-restricted hyperplane that defines a decision boundary separating a first class of data points in the training dataset from a second class of data points in the training dataset.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Figure 1:
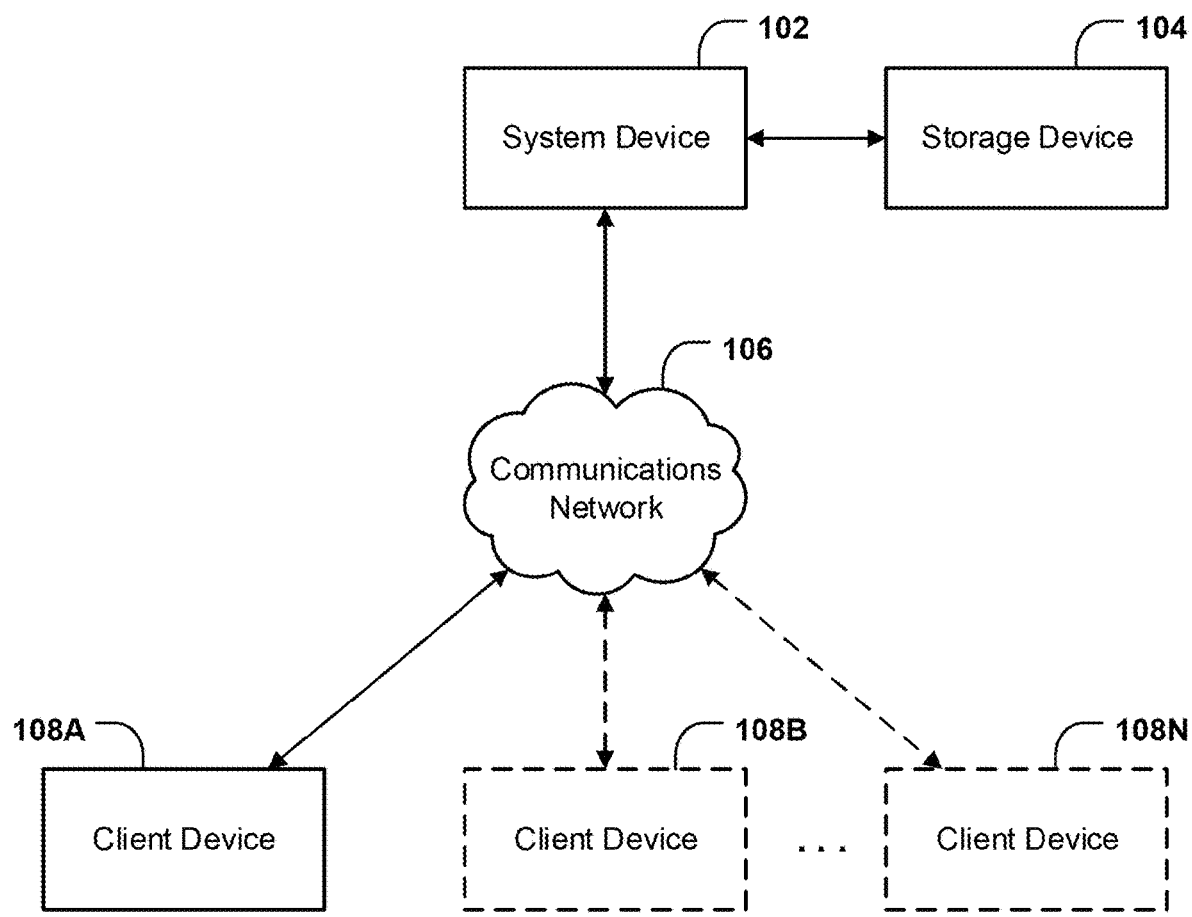
FIG. 1 illustrates an environment in which some example embodiments may be used for training and/or utilizing an SR-SVM.

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for training an SR-SVM to produce a classifier that enhance classification over traditional tools by taking into account shape constraints. The SR-SVM can be formulated as a convex optimization problem. At a high level, the procedure involves two steps.

First, the procedure involves converting the shape-constrained SVM into a simpler bound-constrained SVM via basis function expansion. Use of the term "bound constrained," in this regard, implies that coefficients are greater or equal to 0. By doing this, the exotic types of shape constraints become easier to manage. The process of basis function expansion is analogous to spline expansion, which approximates a nonlinear curve with piecewise constants or a piecewise linear spline function. Due to the flexibility of selecting knots as expansion points, the approach essentially falls into the category of non-parametric methods.

Second, the procedure involves solving the reformulated optimization problem using the active-set optimization algorithm. The algorithm iteratively works on a subset of indexes called the "inactive set,", and defined as the index set where the coefficients are strictly greater than 0. The residual set is called the "active set," where the coefficients equal to zero. With these settings, at each iteration, working on an SVM over the "inactive" index set reduces to a standard unconstrained SVM problem, which can be solved efficiently using existing SVM solvers.

Typically, when applying the basis expansion at knots, the size of the original problem becomes considerably larger, which is a common issue for non-parametric methods. Some different ways to handle this increasing dimensionality are addressed below. Further, although the idea of monotonic classification has been explored in the past, the SR-SVM solution described herein uses a fundamentally different approach, which enables the SR-SVM classifier to handle complex shape constraints; moreover, SR-SVM is a non-parametric approach that includes automatic knot selection to create an optimal spline function.

As demonstrated below through the provided experimental results, it is evident that the use of prior knowledge of shape information in the SR-SVM classifier set forth herein can improve the prediction accuracy and provide better insights to interpret the input features. Another advantage of the SR-SVM solution set forth herein is that it provides enhanced model interpretability. More specifically, because the SR-SVM solution can accommodate the non-linear relationship of the independent features, it is possible to utilize the solution to understand the monotonicity and convexity/concavity of the various features by looking at the fitted marginal effect function $\hat{f}_i(x_i)$. Moreover, this solution also allows modification of the number of knots to use for modeling a given set of training data and thereby better fit the pattern of specific features. However, increasing the number of knots may require more computational burden, and could introduce an overfitting issue for the data.

Although described above at a high level, specific details regarding the configuration of example embodiments for training and utilizing an SR-SVM classifier are provided below.

System Architecture

Example embodiments described herein may be implemented using any of a variety of computing devices or servers. To this end, FIG. 1 illustrates an example environment within which embodiments of the present disclosure may operate. As illustrated, a system device 102 is shown that may perform various operations for training and utilizing an SR-SVM, in accordance with the embodiments set forth herein. The system device 102 is connected to a storage device 104. Although system device 102 and storage device 104 are described in singular form, some embodiments may utilize more than one system device 102 or one or more storage device 104. Whatever the implementation, the system device 102 and any constituent components (as described below in connection with FIG. 2) may receive and/or transmit information via communications network 106 (e.g., the Internet) with any number of other devices. In this regard, system device 102 may be implemented as one or more servers that may interact via communications network 106 with one or more client devices, shown in FIG. 1 as client device 108A, client device 108B, through client device 108N. In this way, the system device 102 may interact with a number of users by offering the ability to train and use an SR-SVM in a software-as-a-service (SaaS) implementation. System device 102 may alternatively be implemented as a device with which users may interact directly. In such embodiments, a user may utilize the system device 102 directly to train and/or use an SR-SVM.

System device 102 may be entirely located at a single facility such that all components of system device 102 are physically proximate to each other. However, in some embodiments, some components of system device 102 may not be physically proximate to the other components of system device 102, and instead may be connected via communications network 106. Particular components of system device 102 are described in greater detail below with reference to apparatus 200 in connection with FIG. 2.

Storage device 104 may comprise a distinct component from system device 102, or it may comprise an element of system device 102 (e.g., memory 204, as described below in connection with FIG. 2). Storage device 104 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 106). Storage device 104 may host the software executed to operate the system device 102 to train an SR-SVM. In addition, or in the alternative, storage device 104 may store information relied upon during operation of the system device 102, such as training data used for training a given SR-SVM. In addition, storage device 104 may store control signals, device characteristics, and access credentials enabling interaction between the system device 102 and one or more of client device 108A through client device 108N.

Client device 108A through client device 108N may be embodied by any computing devices known in the art, such as desktop or laptop computers, tablet devices, smartphones, or the like. These devices may be independent devices, or may in some embodiments be peripheral devices communicatively coupled to other computing devices. Although FIG. 1 illustrates an environment and implementation of the present disclosure in which the system device 102 interacts with one or more of client device 108A through client device 108N, in some embodiments clients may directly interact with the system device 102 (e.g., via input/output circuitry of system device 102), in which case a separate client device need not be utilized. Whether by way of direct interaction or via a separate client device, a client may communicate or otherwise interact with the system device 102 to perform functions described herein and/or achieve benefits as set forth in this disclosure.

Example Implementing Apparatuses

Figure 2:
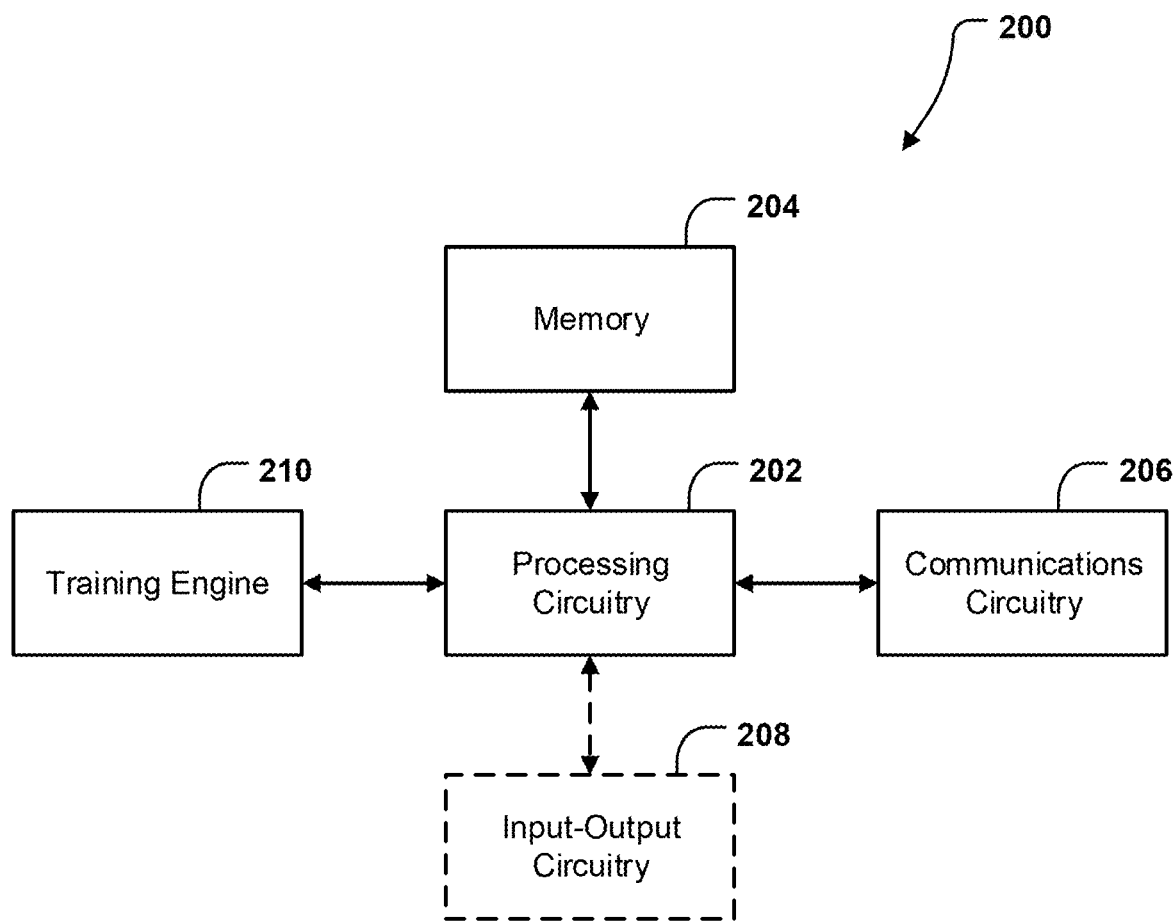
FIG. 2 illustrates a schematic block diagram of example circuitry embodying a device that may perform various operations in accordance with example embodiments described herein.

System device 102 (described previously with reference to FIG. 1) may be embodied by one or more computing devices or servers, such as the apparatus 200 shown in FIG. 2. As illustrated in FIG. 2, apparatus 200 may include processor 202, memory 204, communications circuitry 206, input-output circuitry 208, and training engine 210, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 12-14.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 104, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

Input-output circuitry 208 may be any means configured to provide output to a user and, in some embodiments, to receive an indication of user input. It will be noted that some embodiments will not include input-output circuitry 208, in which case user input may be received via a separate device such as a client device 112 (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a training engine 210 designed to train an SR-SVM using received training data. The training engine 210 may utilize processor 202, memory 204, or any other hardware component included in the apparatus 200 to perform these operations, as described in connection with FIGS. 4-6 below. The training engine 210 may further utilize communications circuitry 206 to gather data from a variety of sources (e.g., any of client device 108A through client device 108N or data store 106, as shown in FIG. 1), and may utilize input-output circuitry 208 to transmit and/or receive data directly from a user.

In addition, the apparatus 200 further comprises digitization circuitry 210 configured to generate, revise, analyze, retrieve, or otherwise utilize a digital affiliated business arrangement disclosure statement (ABAD). The digitization circuitry 210 may utilize processor 202, memory 204, or any other hardware component included in the apparatus 200 to perform these operations, as described in connection with FIG. 8 below. The digitization circuitry 210 may further utilize communications circuitry 206 to gather data from a variety of sources (e.g., client device 108A through client device 108N or storage device 104, as shown in FIG. 1), and may utilize input-output circuitry 208 to exchange information directly with a user.

Although components 202-210 are described in part using functional language, it will be understood that the particular implementations necessarily include the use of particular hardware. It should also be understood that certain of these components 202-210 may include similar or common hardware. For example, the training engine 210, may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the training engine 210 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the training engine 210 is implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by the apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200 for training an SR-SVM, a more detailed description of example embodiments by which the apparatus 200 may operate are described below. Immediately below is a brief description of the standard linear SVM theory. Following that is a description of the SR-SVM methodology as set forth herein, along with the theoretical framework used to solve the SR-SVM by applying an active-set algorithm. Subsequently, results of simulation studies and real data analysis are provided that demonstrate that the SR-SVM solution set forth herein generates better classification results than popular classifiers. Finally, a series of operations will be described in connection with a series of flowcharts in order to illustrate the training and use of an SR-SVM classifier using an example apparatus 200.

Standard Linear SVM

The key concept of a SVM is to create a separating boundary for two-class classification problems. Upon modification, SVM can be easily adopted to handle multi-class problems as follows. Let M be the number of classes, one common technique is to create M one-versus-rest classifiers and choose the class which classifies the data with the largest margin. The other way is to build a set of one-versus-one classifiers and choose the class with the greatest number of votes. The second way involves building $M(M-1)/2$ classifiers.

The introduced notations and algorithms for the standard linear SVM solver are described for the case where there are only two classes. Moreover, it is worth noting that solving the SR-SVM classifier eventually uses the active-set optimization algorithm, which directly calls the standard SVM solver at each iteration without referencing the underlying optimization algorithm.

Denote the training data set as $\{(x_l, y_l)\}$, $l=1, 2, \ldots, N$. Each object includes d features, $x_l \in \mathbb{R}^d$; and each label $y_l$ is from a two-class set $y_l \in \{-1,1\}$. The standard SVM creates a linear separating hyperplane $$\{x | f(x) = x^T \beta + \beta_0 = 0\} \quad (1)$$

with the goal of separating data into two classes as accurately as possible. The coefficients $\beta$ are the parameters to be estimated. The new label prediction follows $\hat{y} = 1\{f(x) \geq 0\}$, where $1\{x\}$ is the indicator function.

Figure 3A:
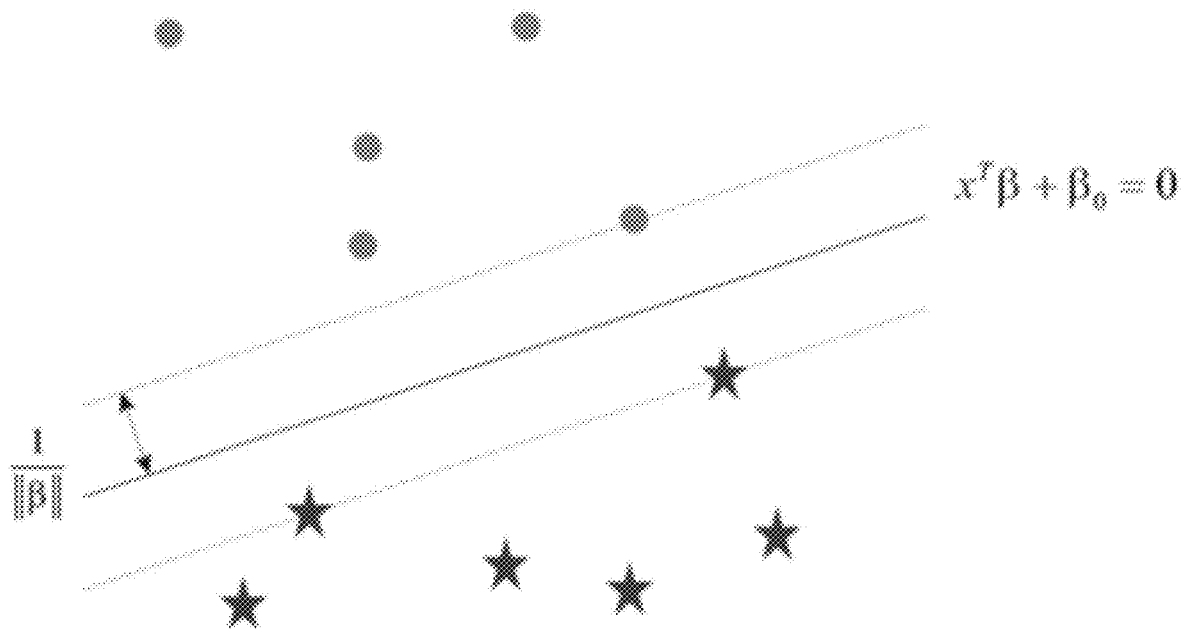
FIG. 3A illustrates an example linear SVM in a separable case.
Figure 3B:
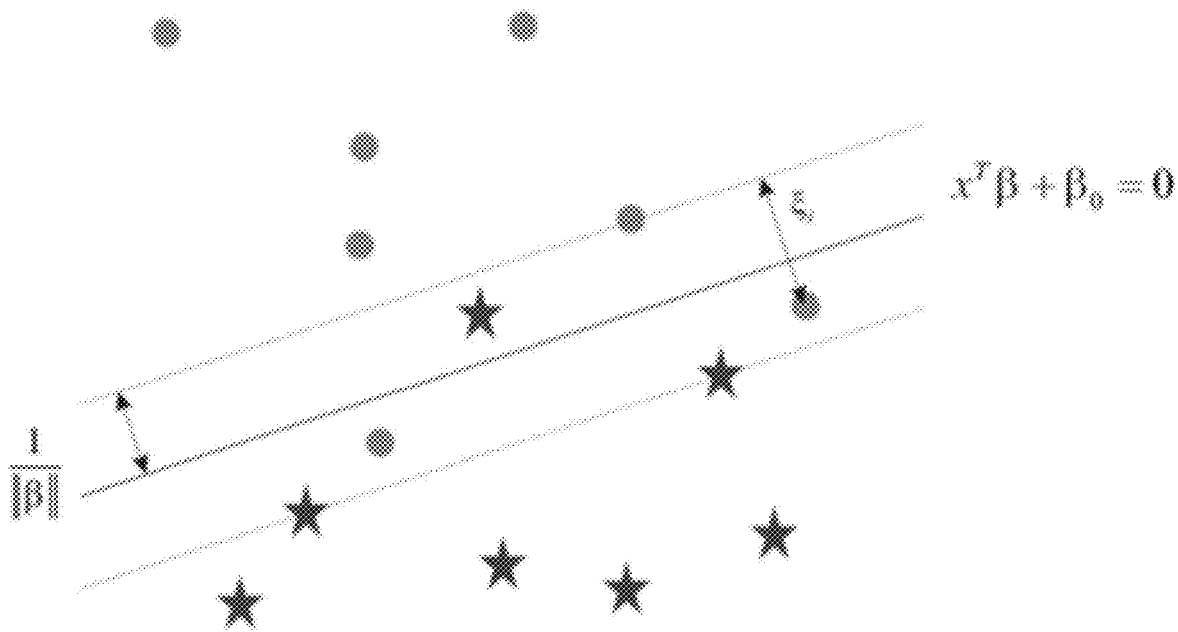
FIG. 3B illustrates an example linear SVM in a nonseparable case.

SVM is formulated as an optimization problem that maximizes the margin of the band region $1/\|\beta\|$, where the band is defined by two shifted hyperplanes $\{x | f_\pm(x) = x^T \beta + \beta_0 = \pm 1\}$. Depending on the data being separable or nonseparable, the objective function is formulated differently for the two cases. FIGS. 3A and 3B provide illustrates of fitting an SVM classifier in each case.

Separable Case:

The separable case is more straightforward. A SVM maximizes the margin, which is the distance between the center hyperplane and shifted hyperplanes. "Support vectors" are defined as data points located on the outer margins. The objective function is to minimize the inverse of the margin $$\min_{\beta, \beta_0} \frac{1}{2} \|\beta\|^2 \quad (2)$$

$$\text{subject to}: y_l(x_l^T \beta + \beta_0) \geq 1, \forall l$$

Enforcing the separable plane could yield infeasible solutions when data are not actually separable. Therefore, the nonseparable case requires additional modifications.

Nonseparable Case:

To address the nonseparable case, SVM introduces new slack variables $\xi = (\xi_1, \xi_2, \ldots, \xi_N)$ and a penalty C into the objective function. A new term is added to penalize any errors in classification. Note that $\xi_l$ becomes positive whenever the data point $x_l$ is incorrectly classified, as depicted in FIG. 3B. The nonseparable case represents a more general scenario than the separable case, where the penalty C controls a trade-off between the error bound and the margin.

$$\min_{\beta, \beta_0} \frac{1}{2} \|\beta\|^2 + C \sum_{l=1}^{N} \xi_l \quad (3)$$

$$\text{subject to}: \xi_l \geq 0, \ y_l(x_l^T \beta + \beta_0) \geq 1 - \xi_l, \forall l$$

A SVM can be solved more efficiently via its Lagrange dual problem which is a convex quadratic programming problem. Introducing Lagrange multipliers $\alpha_l$ and $\mu_l$, $$\alpha_l [y_l (x_l^T \beta + \beta_0) - (1 - \xi_l)] = 0 \quad (4)$$

$$\mu_l \xi_l = 0 \quad (5)$$

The primal problem is $$L_P = \frac{1}{2} \|\beta\|^2 + C \sum_{l=1}^{N} \xi_l - \sum_{l=1}^{N} \alpha_l [y_l(x_l^T \beta + \beta_0) - (1 - \xi_l)] - \sum_{l=1}^{N} \mu_l \xi_l \quad (6)$$

and the dual problem is $$L_D = \sum_{l=1}^{N} \alpha_l - \frac{1}{2} \sum_{l=1}^{N} \sum_{l'=1}^{N} \alpha_l \alpha_{l'} y_l y_{l'} x_l^T x_{l'} \quad (7)$$

$$\text{subject to}: \sum_{l'} y_{l'} \alpha_{l'} = 0, \ 0 \leq \alpha \leq C$$

where $L_D$ is a quadratic programming problem and can be solved with existing quadratic programming algorithms.

The kernel transformation adds flexibility for the linear SVM to create nonlinear hyperplanes. For a symmetric continuous function $K(x, x'): \mathbb{R}^N \times \mathbb{R}^N \to \mathbb{R}$ satisfying Mercer's condition, the function can be decomposed as $K(x, x') = \psi(x)^T \psi(x')$, where $\psi(x)$ is a mapping function. There are several common types of kernel mappings in practice: RBF (Gaussian), polynomial, and sigmoid. SVM with nonlinear kernel transformation provides better classification result as it handles nonlinear effects.

Shape-Restricted SVM

The SR-SVM set forth herein is formulated below as an optimization problem that can accommodate shape restrictions for hyperplanes. As described herein, nine types of shapes are supported by SR-SVM classifier, including linear, monotonic, convex, and concave, and combinations of these types. Table 1 provides a list of the nine shape constraints. Each feature i, $i=1, \ldots, d$ may include a different shape constraint. Even if a hyperplane is marginally convex or concave along each feature, it is not necessary that the multi-dimensional hyperplane itself is convex or concave. In other words, shape information over interaction of features is not considered.

TABLE 1

Supported shape constraints

| Shape # | Shape type | Shape label |
|---|---|---|
| 1 | Linear | l |
| 2 | Monotone increasing | in |
| 3 | Monotone decreasing | de |
| 4 | Convex | cvx |
| 5 | Convex increasing | cvxin |
| 6 | Convex decreasing | cvxde |
| 7 | Concave | ccv |
| 8 | Concave increasing | ccvin |
| 9 | Concave decreasing | ccvde |

Constructing an SR-SVM by basis function expansions. In a linear SVM, the separating hyperplane is expressed in a linear form as $$f(x) = x^T \beta + \beta_0 = \sum_{i=1}^{d} x_i \beta_i + \beta_0$$

with d features. In order to construct a nonlinear hyperplane using an SR-SVM, each linear component from the linear SVM is substituted with a nonlinear function subject to shape restriction type $c_i$:

$$x_i \beta_i \rightarrow f_i(x_i)$$

The shape type $c_i$ for $f_i$ is chosen from the prior type set $c_i \in \{1, 2, \ldots, 9\}$ (see Table 1). For example, $f_i(x)$ can be a monotone increasing function for shape type #2, "Increasing." Therefore, the new hyperplane is defined as $$f(x) = \sum_{i=1}^{d} f_i(x_i) + \beta_0 \quad (8)$$

Note that for shape type #1, "Linear," the function $f_i(x_i)$ degenerates to the linear term $x_i \beta_i$.

The key to tackling these exotic shape constraints is to apply expansion over some basis functions at a predetermined knot set. The nonlinear function $f_i(x_i)$ is then approximated by stacking all the basis functions with weights, resulting in an approximation spline function to be either a piecewise linear or polynomial function. As a result, the conceptually complicated nonlinear SVM with shape constraints problem is converted to a standard linear SVM with some bound constraints (coefficients $\beta > 0$). Further elaboration upon this process is provided below.

Below is an illustration of how to construct the SR-SVM. The classifier requires input of a candidate knot set. The optimization algorithm will determine which knots are actually used by assigning a strictly positive weight to the basis function. In practice, there are several choices of candidate knots, each having pros and cons.

Let $\{X_{j,i}\}_{j=1}^{K_i}$, i=1, . . . , d be the $K_i$ knots for basis expansion for feature $x_i$. Assuming the nodes are already ordered for each i, $$X_{1,i} \leq X_{2,i} \leq \ldots \leq X_{K_i,i}$$

Denote order statistics as $\{X_{j,i}\} = \{X_{(j),i}\}$. If one assumes all the points are used as knots, then each $K_i = N$.

Select percentiles of input $x_i$ as pre-determined knots, for example $\{X_{j,i}\} = \{0.1, 0.2, \ldots, 0.9\}$, can be the knot set. If the same set of K quantile thresholds are applied for all dimensions, then $K_i = K$.

The individual basis function linked to the knot set $\{X_{j,i}\}_{j=1}^{N}$ is defined as $$g_{ji}(x_i) = \begin{cases} 1_{\{X_{j,i} \leq x_i\}} & \text{if } c_i = 2(\text{"in"}), \\ 1_{\{x_i < X_{j,i}\}} & \text{if } c_i = 3(\text{"de"}), \\ (x_i - X_{j,i}) 1_{\{X_{j,i} \leq x_i\}} & \text{if } c_i = 4(\text{"cvx"}) \text{ or } c_i = 5(\text{"cvxin"}), \\ (X_{j,i} - x_i) 1_{\{x_i \leq X_{j,i}\}} & \text{if } c_i = 6(\text{"cvxde"}), \\ (X_{j,i} - x_i) 1_{\{X_{j,i} \leq x_i\}} & \text{if } c_i = 7(\text{"ccv"}) \text{ or } c_i = 9(\text{"ccvde"}), \\ (x_i - X_{j,i}) 1_{\{x_i \leq X_{j,i}\}} & \text{if } c_i = 8(\text{"ccvin"}), \end{cases} \quad (9)$$

Figure 4A:
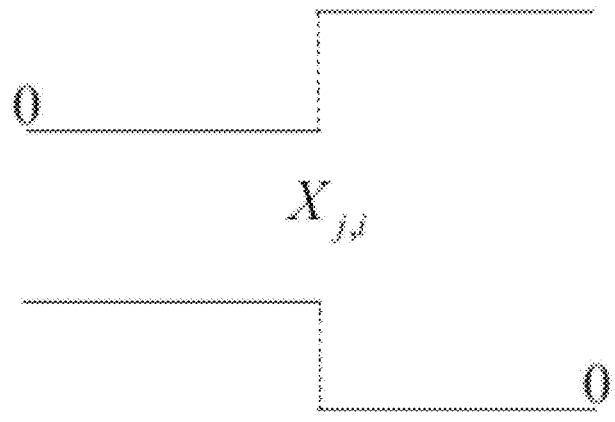
FIG. 4A illustrates example step functions for monotone increasing ("in") and monotone decreasing ("de") types, as may be used in some example embodiments described herein.
Figure 4B:
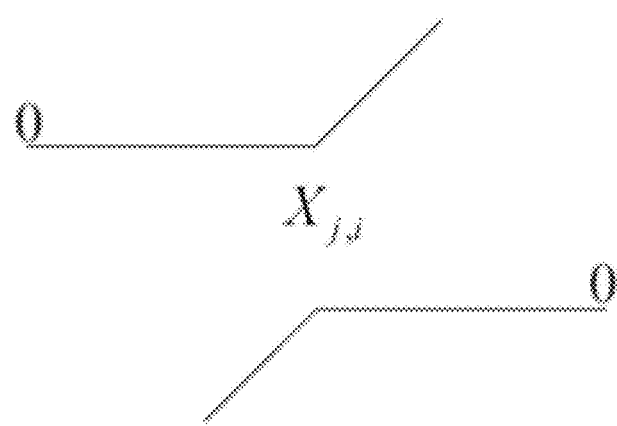
FIG. 4B illustrates example continuous functions for convex and concave types, as may be used in some example embodiments described herein.

FIGS. 4A and 4B present the four types of basis functions. FIG. 4A plots the monotone increasing or decreasing types ("in") and ("de"), where the basis functions are step functions; FIG. 4B plots two (out of the four) types of basis functions for the convex or concave type related shapes, and the functions are wedge-shape functions.

After applying the basis expansion, $f_i(x_i)$ can be approximated by a linear combination of the basis functions $$f_i(x_i) \sim \hat{f}_i(x_i, \{\beta_{1i}, \ldots, \beta_{Ni}\}) = \sum_{j=1}^{K_i} \beta_{ji} g_{ji}(x_i), \text{ subject to: } \beta_{ji} \geq 0 \quad (10)$$

Figure 5A:
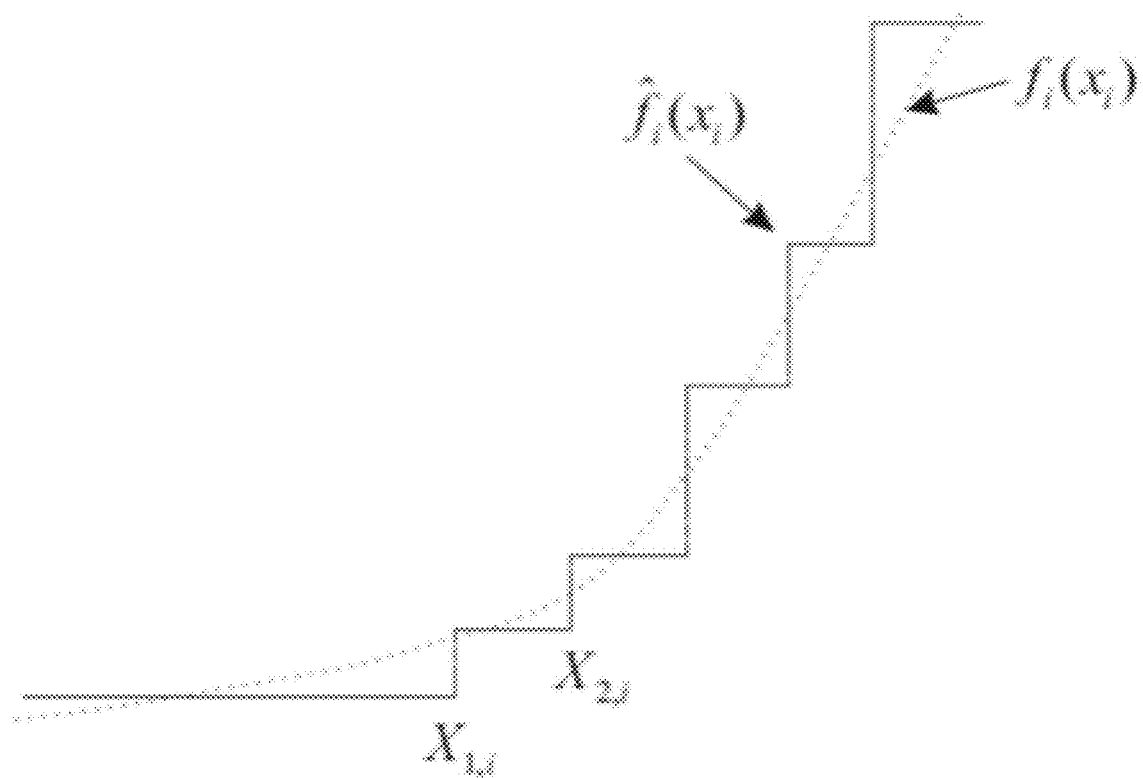
FIG. 5A illustrates an example approximation of a nonlinear function created by stacking monotone increasing ("in") basis functions as a piecewise linear function, as may be used in some example embodiments described herein.
Figure 5B:
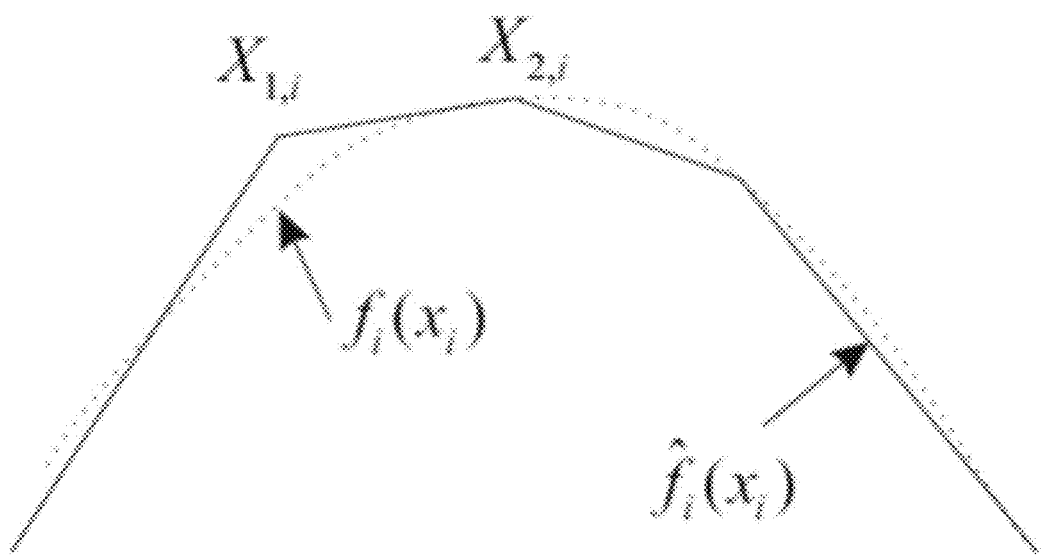
FIG. 5B illustrates an example approximation of a nonlinear function created by stacking concave ("ccv") basis functions as a piecewise linear function, as may be used in some example embodiments described herein

Specifically, for monotone increasing or decreasing types, the spline function $\hat{f}_i$ is a discrete piecewise constant (see FIG. 5A); while for convex and concave types, $\hat{f}_i$ is a continuous piecewise function (see FIG. 5B). $\beta_{ji} > 0$ indicates that knots $X_{ji}$ are eventually used in the basis function expansion, where either a function value "jump" or a slope change occurs.

Since the linear constraint (type #1) is effectively defined with one parameter, without loss of generality, we assume that the first $d_1$ features $\{i=1, 2, \ldots, d_1\}$ are linear type ($c_i = 1$). The remaining features $\{i = d_1+1, d_1+2, \ldots, d\}$ include shape restrictions (type $c_i \geq 2$).

Adding the component function $\hat{f}_i$, the proposed SR-SVM optimizes the hyperplane in the form of $$\left\{ x \mid \hat{f}(x, \beta) = \beta_{00} + \sum_{i=1}^{d_1} \beta_{0i} g_{0i}(x_i) + \sum_{i=d_1+1}^{d} \sum_{j=1}^{K_i} \beta_{ji} g_{ji}(x_i) = 0 \right\} \quad (11)$$

subject to: $\beta \in B := \begin{cases} \beta_{ji} \geq 0, \forall_j = 1, 2, \ldots, K_i \text{ and } c_i \in \{2, 3, 5, 6, 8, 9\} \\ \beta_{ji} \geq 0, \forall_j = 2, \ldots, K_i \text{ and } c_i \in \{4, 7\} \end{cases}$ Compared to the standard linear SVM with (1+d) parameters, the number of parameters in the problem increases from (1+d) to $$\left( 1 + d_1 + \sum_{i=d_1}^{d} K_i \right).$$

The parameter vector $\beta$ to be estimated is $$\beta = \quad (12)$$
$$\{\beta_{00}, \beta_{01}, \ldots, \beta_{0d_1}, \beta_{1(d_1+1)}, \ldots, \beta_{K_{d_1+1}(d_1+1)}, \ldots, \beta_{1d}, \ldots, \beta_{K_d d}\}$$

The SR-SVM may be formulated as a convex optimization problem, and to do this one penalizes the margin size of the hyperplanes plus any prediction violations. The objective function remains the same as the linear SVM optimization (Equation (3)). The main difference is that the SR-SVM includes additional linear bound constraints $\beta \in B$. Prior to the basis function expansion, SR-SVM is a convex optimization problem as all nine shape constraints are convex constraints; post the conversion, it is still a convex optimization problem but with much simpler bound constraints. For example, for the monotone increasing shape, the original problem requires $f_i(X_{1,i}) \leq f_i(X_{2,i}) \leq \ldots \leq f_i(X_{K_i,i})$; as a comparison, the new constraints are on selected linear coefficients $\beta_{ji} \geq 0$.

The length of the parameter $\beta$ to be solved increases to $$\left(1 + d_1 + \sum_{i=d_1}^{d} K_i\right),$$

which is larger than the unconverted SVM.

$$\min_{\beta} \frac{1}{2}\|\beta\|^2 + C \sum_{l=1}^{N} \xi_l \qquad (13)$$

subject to: $\xi_l \geq 0$, $y_l \hat{f}(x_l, \beta) \geq 1 - \xi_l$, $\forall\, l$, $\beta \in B$ This presents the formulation of the complex shape type constraints into bound constraints via basis function expansion. The optimization problem structure becomes more transparent at the cost of problem size increasing considerably. As noted, the size increment depends on how many knots are used along each component feature. It is not necessary to use the full set of ordered data points as knots. From simulation studies and real data analysis as shown below, it appears that selection of 10 to 20 knots is likely to provide a decent approximation of each component function, $f_i(x_i)$.

Active-Set Optimization Algorithm on SR-SVM

The SR-SVM is formulated as a constrained optimization problem in Equation (13), which can be treated as a standard SVM optimization problem plus some non-negative bound constraints. In this section, the problem is solved by applying the active-set optimization algorithm. First, a description of the active-set algorithm is provided, followed by a discussion of specific algorithmic details.

The active-set algorithm iteratively updates a working subset of component indexes S where the simple bound constraints are "inactive", or $\beta$ strictly greater than 0

$\beta_{ji} > 0, \forall (j, i) \in S$

The subset is also known as an "inactive" index set or "inactive set". On the other hand, the complement of the working set S includes all indices of "active" constraints $\beta_{ji} = 0, \forall (j, i) \notin S$ The general framework of the active-set algorithm includes two parts:

The working index set $S_k$ is updated at each iteration k, either adding an index or removing an index. More details of the procedure to update the set $S_k$ are discussed below.

Once the set $S_k$ is specified, the optimization algorithm solves an optimization sub-problem over the working set, or equivalently enforcing $\beta_{ji} = 0$, $\forall (j, i) \notin S_k$. One can find that that each optimization sub-problem is exactly the same form as a standard linear SVM. This allows us to efficiently solve it using any standard SVM solver, without getting into the algorithmic complexities in the solver.

$$\min_{\beta,(j,i)\in S_k} \phi(\beta) = \frac{1}{2}\|\beta\|^2 + C \sum_{l=1}^{N} \xi_l \qquad (14)$$

subject to: $\xi_l \geq 0$, $y_l f(x_l, \beta \mid (j, i) \in S_k) \geq 1 - \xi_l$, $\forall\, l$ where $$f(x_i, \beta \mid (j, i) \in S_k) = \beta_{00} + \sum_{i=1}^{d_1} \beta_{0i} g_{0i}(x_i) + \sum_{i=d_1+1}^{d} \sum_{(j,i)\in S_k} \beta_{ji} g_{ji}(x_i)$$

The size of data input to the sub-problem equals the size of the working index set $S_k$.

The active-set optimization algorithm is implemented in four steps below:

Step 1: Initialize the working set $S_1 = \{(0, i) | i=1, 2, \ldots, d_1\} \cup \{(1, i) | c_i = 4, 7\}$ Step 2: At kth iteration, solve the active-set sub-problem (Equation 14) to obtain a potential solution $\hat{\beta}^{(k)}$.

Step 3: If the solution $\hat{\beta}^{(k)}$ is infeasible: $\hat{\beta}^{(k)} \notin B$ (implying some components are negative), then apply a step size multiplier to map the solution back to the feasible region. Determine a maximum ratio $p \in [0,1]$ such as the interpolated solution $\beta^{(k+1)} = (1-p)\beta^{(k)} + p\hat{\beta}^{(k)}$ is feasible. The ratio p is effectively computed as $$p = \min_{(j,i)\in S_k \setminus S_1} \frac{\beta_{ji}^*}{\beta_{ji}^* - \bar{\beta}_{ji}}, \quad S_- = \mathrm{argmin}_{(j,i)\in S_k \setminus S_1} \frac{\beta_{ji}^*}{\beta_{ji}^* - \bar{\beta}_{ji}}$$

$S_-$ represents the index set such that the new solution $\beta^{(k+1)}$ hits the boundary. Then remove the index set from the working set $S_k := S_k \setminus S_-$ and proceed to Step 2 to rerun the sub-problem.

Step 4: At this step, the solution $\beta^{(k)}$ should be feasible. Next, compute the gradient of the primal function $$D_{ji}^{(k)} = \frac{\partial L_P}{\partial \beta_{ji}}(\beta^{(k)}).$$

If the gradient is negative, the optimal solution is obtained; otherwise, compute the maximum index $S_+ = \mathrm{argmin}_{(j,i)} D_{ji}^{(k)}$ and add to the working set $S_k := S_k \cup S_+$.

At Step 4, derivation of the gradient function of the objective function with respect to the parameter $\beta$ follows $$D = \frac{\partial L_P}{\partial \beta} = \beta - \sum_{l=1}^{N} \alpha_l y_l x_l$$

To calculate this gradient, it requires getting into the SVM solver and extracting the optimal Lagrange multipliers $\alpha_l$, which are byproducts of the algorithm.

Note that in the steps above, whenever a) an optimization sub-problem is solved as set forth in Step 2; b) an infeasible solution is mapped back to a feasible region by reducing the step size, as set forth in Step 3, or c) the problem's constraint set is relaxed by adding a new index, as set forth in Step 4, the objective function value decreases, and it continues decreasing iteration by iteration. As a minimization problem, this drives the method to find the minimum function value, which is the optimal solution to the problem. At Step 4, the choice of selecting the maximum derivative index is to find a direction for the objective function to decrease the most sharply. Moreover, due to finite number of constraints in the problem, it guarantees the convergence of the active-set algorithm in a finite number of iterations.

The efficiency of the active-set algorithm depends on the size of the sub-problem and the number of simple constraints described above. The number of constraints is highly correlated to the knots selected. As discussed, there are three common practices for choosing a candidate knot set. A first practice, using the full order statistics, is a rather exhaustive method of local search; this is inevitably time-consuming, especially when the sample size N is large (for example, $K_i$=N). A second practice, using specific percentiles as knots, is a practical option. Using this option, one may typically start with 10 knots at pre-set percentiles, such that the hyperplane still produces decent approximation but does not consume too much additional computational resources. A third approach, using customized knots, is fairly discretionary, and requires a good understanding of the relationship between a specific feature and the prediction.

At the start of the algorithm, the iteration number k=0, the size of the optimization sub-problem is small, because the inactive index set (the working index set) $S_1$ starts with fewer indices, mainly consisting of linear constraints. From an alternative view, for data input corresponding to the active index set where $\beta_{ji}$=0, the data is excluded or filtered out from the sub-problem. As the algorithm iterates, new indices are added to the inactive set, and the computational time increases gradually.

The number of constraints determines the total iterations of the active-set algorithm. It has been determined through observation that the total number of iterations used is typically up to half of the number of parameters in the problem, or $$\left(1 + d_1 + \sum_{i=d_1}^{d} K_i\right).$$

The number of iterations is close to the size of the "inactive" set, which means in every iteration, a new index is added to the 'inactive set." This is a non-parametric method which always faces the trade-off between model flexibility and computational cost.

One may be interested in the subtle difference of using the "cvxin" or "ccvin" shapes versus the "in" shape (and vice-versa for the "de" type). The increasing shape "in" seems to be a more intuitive setting. FIGS. 5A and 5B show that approximating monotone shape types actually uses a piecewise constant function, while for other convex or concave types, the approximating function is a piecewise continuous function. The result illustrates that using a piecewise continuous function shows a significantly better approximation accuracy. Another advantage is that it uses fewer knots, which means fewer iterations, and faster convergence speed. To handle increasing shape constraints, "cvxin" or "ccvin" types of shapes are preferable to the standard "in" shape. Even though choosing convex or concave may be intriguing at the beginning, in practice, if one incorrectly uses the opposite type (i.e., convex types for concave data), the algorithm will degenerate to a line without applying transformation at any knots.

Simulation Examples Comparing SR-SVM to SVM Performance

Three simulation examples were designed to show classification performance when shape information is present. Using the three simulation examples, the SR-SVM classifier is compared with a SVM that uses linear or Gaussian kernels. For illustration purposes, all the examples presented in this subsection only have two input features $\{x_1, x_2\}$ (d=2), in order to trace out the separating curves (instead of hyperplanes). The target attribute y is generated based on $x_1$ and $x_2$, and y has two labels $\{-1,1\}$. For purposes of identification, in each example, one of $x_1$ or $x_2$ is fixed with the shape type #1, "linear", and the other feature can take any pre-specified shape type as shown in Table 1. The SR-SVM classifier and all the analyses are implemented in MATLAB R2019b on a 2.90-GHz Intel Core i7-7820HQ CPU with 16-GB RAM running Windows 10.

In the following, for the three examples, the expectation is to create a (shape-restricted) non-parametric curve that separates the two areas in 2D-plane. The output class y is set to be either −1 (red dots) or 1 (light blue dots) representing the two areas. In execution of the three simulation examples, 10% random noise is generated in the training data set to make it more realistic, and all the figures and results are based on test data.

A Step Function

Figure 6A:
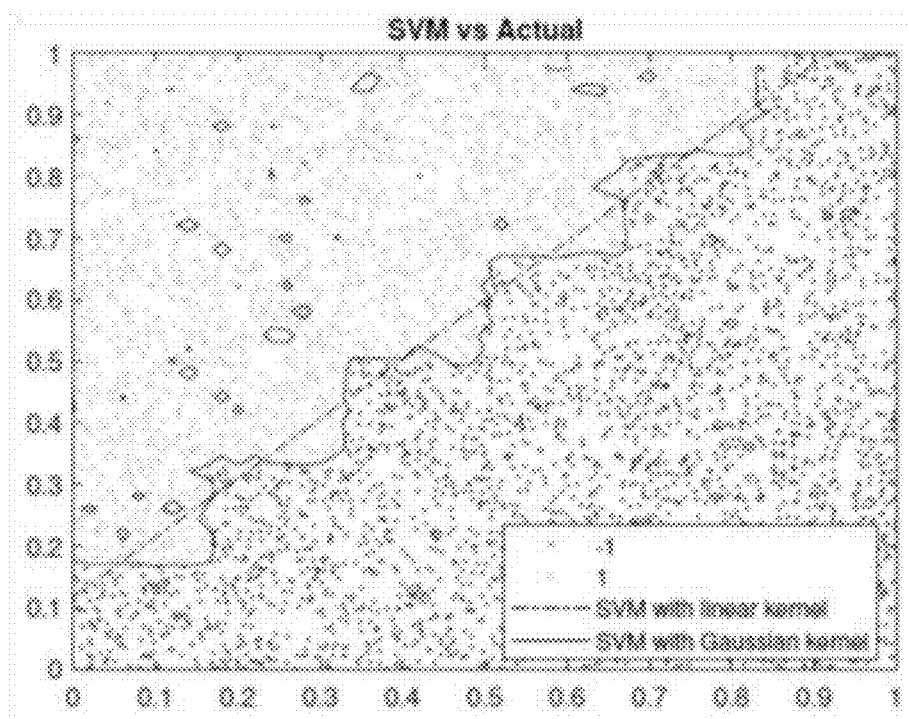
FIG. 6A illustrates separating hyperplanes generated for a first example simulation using a SVM with a linear kernel and a SVM with a Gaussian kernel.
Figure 6B:
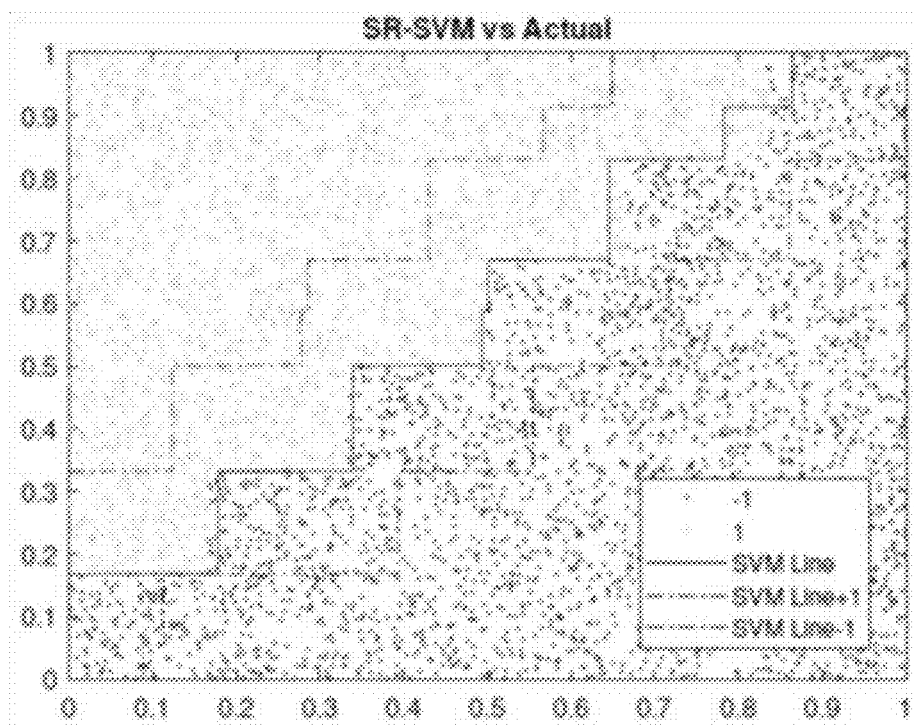
FIG. 6B illustrates separating shape-restricted hyperplanes generated for the first example simulation using an SR-SVM, in accordance with example embodiments described herein.

The first example creates two areas separated by a monotone increasing step function which is a non-parametric function. FIGS. 6A and 6B show a comparison between SVMs (FIG. 6A) and the SR-SVM (FIG. 6B) for the case where the $x_1$ is linear, and $x_2$ has "in" (monotone increasing) shape. The SR-SVM traces the step function well by specifying a simple monotone shape constraint. The linear SVM fails to separate out the zig-zag region where the two areas join. The nonlinear SVM with Gaussian kernel does a better job following the step function but does not guarantee the monotonicity. Moreover, it classifies noises incorrectly (creating small contour circles), which overfits the data. When setting up the SR-SVM, the full order statistics $\{x_{(j),i}\}$ are used as the candidate knot set and the only information passed to the classifier is that the $x_2$ direction is monotone increasing. As observed, the SR-SVM automatically determines which knots are used where a positive "jump" (corresponding to $\beta_{j,i}$>0) should occur. Ideally, the step function can be approximated by 6 constant steps. In the actual estimation, the approximation function uses 9 piecewise constants due the noise present. When the curve flattens out at the knot, it implies the parameter $\beta_{j,i}$=0 or $\{j, i\}$ is in the active set.

A Convex Function

Figure 7A:
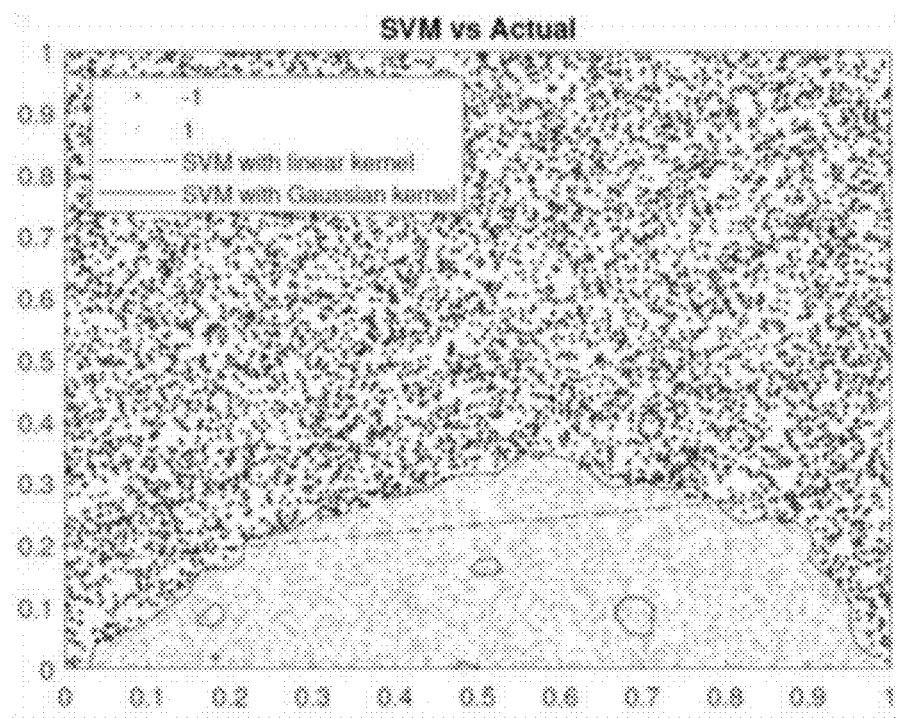
FIG. 7A illustrates separating hyperplanes generated for a second example simulation using a SVM with a linear kernel and a SVM with a Gaussian kernel.
Figure 7B:
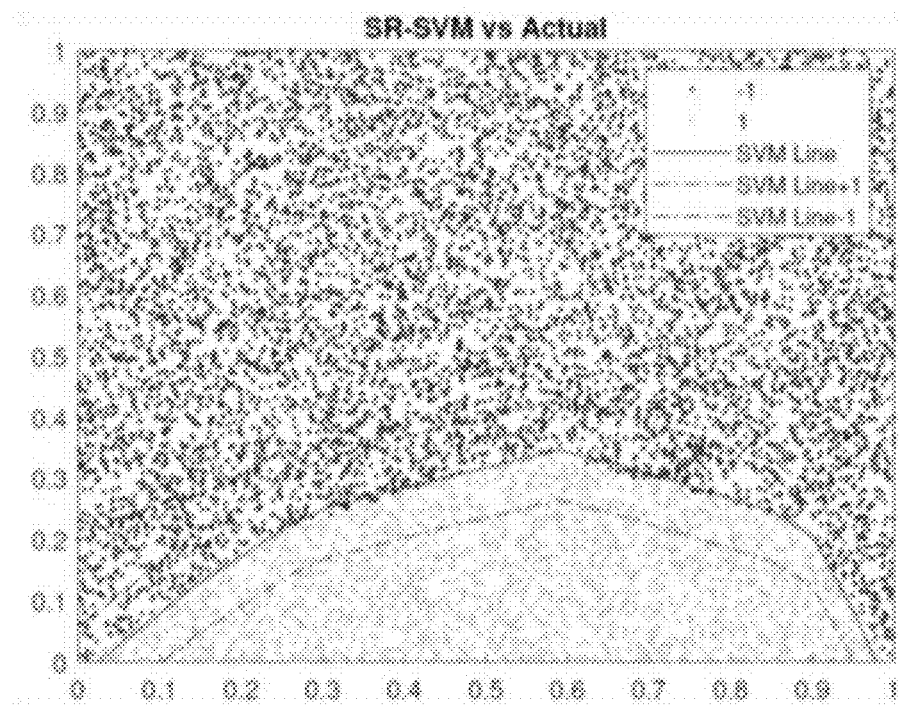
FIG. 7B illustrates separating shape-restricted hyperplanes generated for the second example simulation using an SR-SVM, in accordance with example embodiments described herein.

The second example, as shown in FIGS. 7A and 7B, shows a classification case for a concave shape area. This example shows that the SR-SVM can handle complex shape constraints besides monotonicity. This example was performed using 19 equally spaced percentiles from 0.05 to 0.95 plus two minimum and maximum points as the knot set, and specified the shapes as $x_2$="1" (linear), and $x_1$="CCV" (concave) shape. The constructed separating curve is a piecewise linear concave function. The algorithm ended up with 13 knots in the inactive set (or 14 linear segments). FIG. 7B shows that the piecewise linear function can approximate the underlying concave function quite precisely. As shown in FIG. 7A, however, the linear SVM again fails to capture the concavity, and the SVM with Gaussian kernel can capture the shape, but it still overfits the data. The non-linear separating curve is distorted by the noise in the sample, which makes the input feature hard to interpret.

Figure 8:
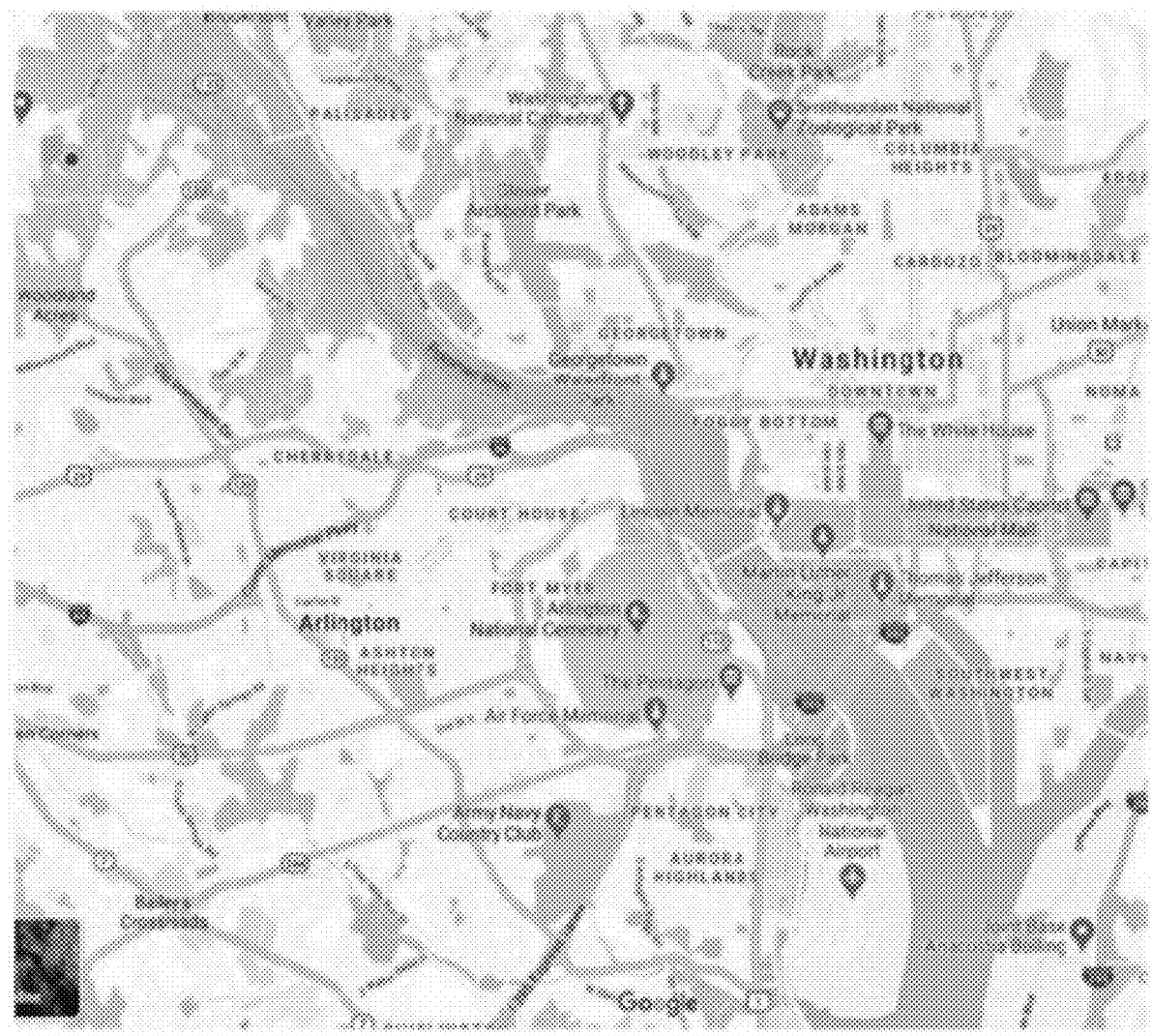
FIG. 8 illustrates a third example simulation comprising a cropped map of the Potomac river.
Figure 9A:
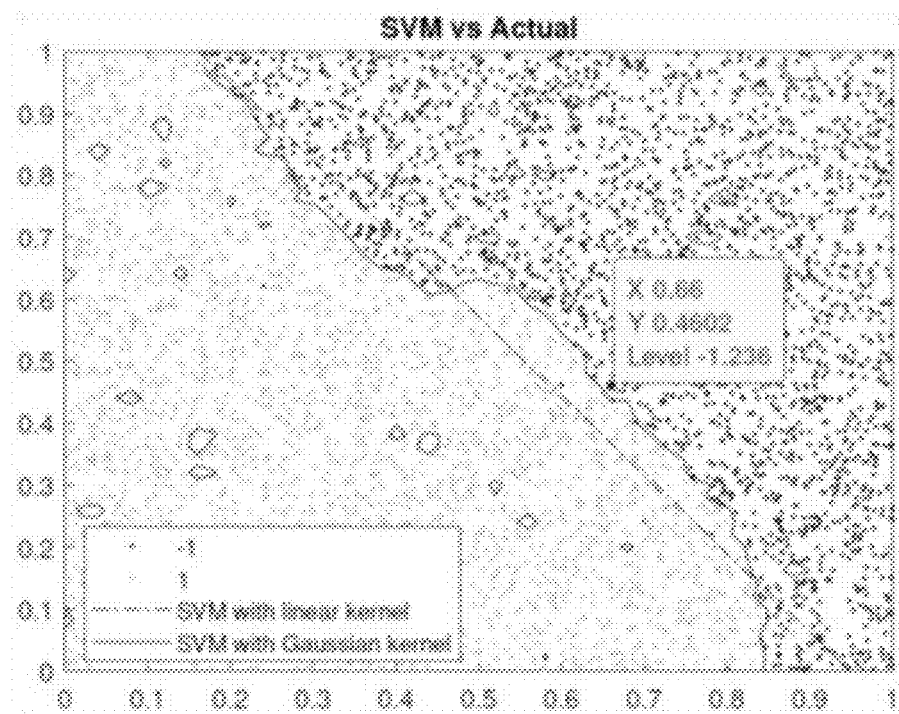
FIG. 9A illustrates separating hyperplanes generated for the third example simulation using a SVM with a linear kernel and a SVM with a Gaussian kernel.
Figure 9B:
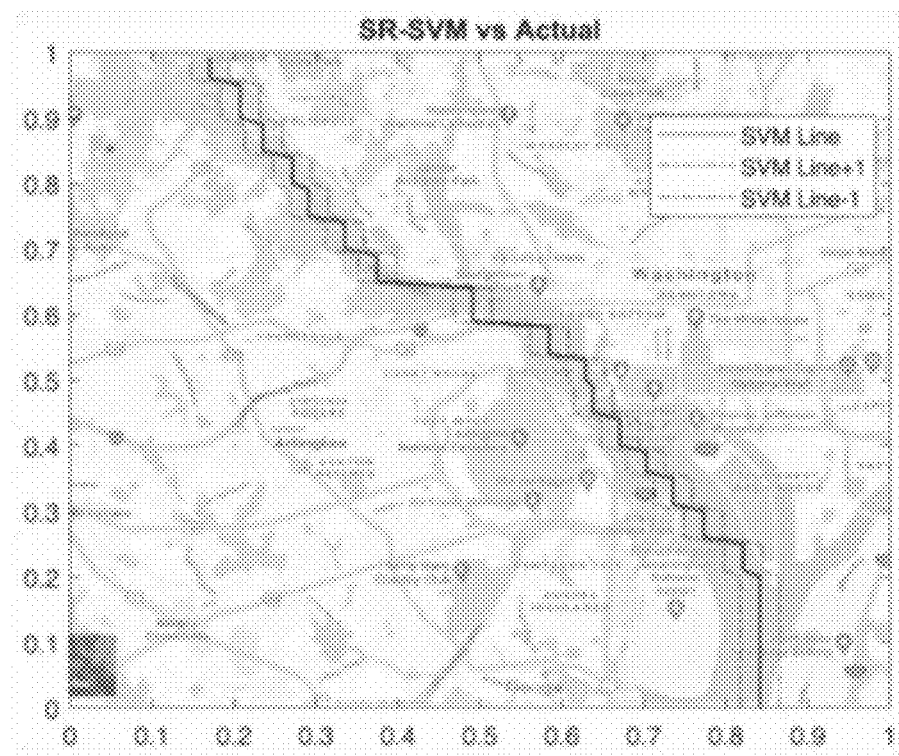
FIG. 9B illustrates separating shape-restricted hyperplanes generated for the third example simulation using an SR-SVM, in accordance with example embodiments described herein.

Tracing the Potomac River that Separates District of Columbia (DC) from Virginia The third example comes from a real world map. This example shows that for any arbitrarily shaped curve, as long as its shape falls into one of the 9 types of shapes, a non-parametric approach approximates the separating curve well. In this example, the map of the Potomac river near the DC area (as shown in FIG. 8) is cropped. The SR-SVM solution is used to construct a step function curve to trace the center of the "river" that separates Washington, D.C. and Virginia. Note that the flow of the river has a monotone decreasing trend, thus $x_1$ is set to be linear, and $x_2$ is set to be the shape "de" (monotone decreasing). The full order statistics set is again used as the possible knot set. The step function generated can closely track the center of the river as projected. The result is plotted in FIGS. 9A and 9B. Even though the shape list does not have a mixture of convex and concave types, sometimes setting a simple monotone shape constraint can capture the shape well, while the linear SVM or SVM with Gaussian kernel has similar problems as described in other examples above.

From the three examples, one can see that the linear SVM fails to separate out the classes of y because its simplistic linear structure. Using the Gaussian kernel, the nonlinear SVM separates out the two classes quite precisely; however, it exhibits a bit of overfitting to noisy data. The SR-SVM manages to handle all cases well and generate clean separating curves (black solid line) with decent accuracy. Another advantage is that, even though the SR-SVM takes simple input such as "monotone increasing" or "convex", the algorithm automatically determines the optimal knot values to construct the approximating piecewise constant/linear function.

On the other hand, since the SR-SVM is a non-parametric method with pre-specified knots, it gains the predictive accuracy while losing computational efficiency in the model estimation. Regarding the three examples above, Table 2 shows predicting accuracy (average accuracy of 0-1 loss) along with the CPU time of SR-SVM, SVM (linear) and SVM (Gaussian). The SR-SVM classifier and the SVM with Gaussian kernel have comparable prediction accuracy (because the SVM with Gaussian kernel is essentially a parametric method which has advantage in computational speed.

TABLE 2

Accuracy and CPU time (seconds, in parenthesis) of SR-SVM, SVM (Linear) and SVM (Gaussian).

| Data set | SR-SVM | SVM (Linear) | SVM (Gaussian) |
| --- | --- | --- | --- |
| Step function | 0.98351 (21 s) | 0.9633 (5 s) | 0.9626 (4 s) |
| Convex function | 0.9899 (10 s) | 0.9318 (0.3 s) | 0.9843 (0.4 s) |
| Potomac River | 0.9833 (34 s) | 0.9555 (3 s) | 0.9883 (3 s) |

Real-World Examples

This section provides the results from testing the SR-SVM against other classifiers over several real examples. The other classifiers examined in this section are the following: SVM with linear kernel, SVM with Gaussian kernel, Classification tree, Classification tree using Adaptive Boosting, Partially Monotone SVM (PM-SVM), and Ordinal Learning Method (OLM). In the following analysis, the PM-SVM method uses a Randomised Conjunctive (CJ1) algorithm for generating the constraint set. The datasets are from the UCI Machine Learning Repository (Dheeru Dua and Casey Graff. UCI machine learning repository, 2017) and the WEKA machine learning framework is utilized (M. Hall, E. Frank, G. Holmes, B. Pfahringer, P. Reutemann, and I. Witten. The weka data mining software: an update. *ACM SIGKDD explorations newsletter*, 11(1): 10-18, 2009). The data statistics are summarized in Table 3, where entries with missing values have been removed. For all the datasets, the decision attribute is set to include only two classes for illustration purpose. For specific datasets, when the decision attribute has more than two classes, certain thresholds are used to split the response into only two classes. For example, in the CPU dataset, the attribute "Class" is split using the threshold at 100.

TABLE 3

Description of data sets used in experiments.

| Data set | #Obs | #Features | # Original Classes | Threshold | Source |
| --- | --- | --- | --- | --- | --- |
| AutoMPG | 392 | 7 | Continuous | MPG ≥ 30 | UCI |
| CPU | 209 | 6 | Continuous | class > 100 | UCI |
| Car | 1728 | 6 | 4 | class = unacc vs. others | UCI |
| Pima | 768 | 8 | 2 | NA | UCI |
| Wisc Breast Cancer (WBC) | 683 | 9 | 2 | NA | UCI |
| ERA | 1000 | 4 | 9 | out1 ≥ 6 | WEKA |
| ESL | 488 | 4 | 9 | out1 ≥ 6 | WEKA |
| LEV | 1000 | 4 | 5 | out1 ≥ 3 | WEKA |
| SWD | 1000 | 10 | 4 | out1 ≥ 4 | WEKA |

For each dataset, 10-fold cross-validation is conducted, where each validation uses a random 90% source data as training samples, and the remaining 10% data as test samples. The same training/test partition and CV partitions are used for all other classifiers to ensure a fair comparison. The performance measure is the average accuracy, which is one minus the mean misclassification rate of 0/1 loss calculated from the 10-fold cross-validation. The results of both the average accuracy and the standard deviation of accuracy are reported in Table 4.

For the SR-SVM, since the shape restricted constraints are hyper-parameters of the classifier, the following guidelines are used to determine the shape types for each independent feature.

1. Assign "linear" shapes to all features as the base shape. Accordingly, in the beginning, the SR-SVM classifier is equivalent to a linear SVM.
2. Use data feature descriptions, scatter plots, and linear model coefficients to explore basic relationships of each feature $x_i$ to the decision class y. Try to determine basic shape information such as "increasing" versus "decreasing".
3. Once the basic trends are determined, it is preferable to assign either "convex increasing" or "concave increasing" to replace increasing "linear", and vice versa for "decreasing".
4. For special circumstances, use "increasing" or "decreasing".
5. Repeat Steps 2 to 4 for each feature until overall model accuracy becomes stable.

Figure 10:
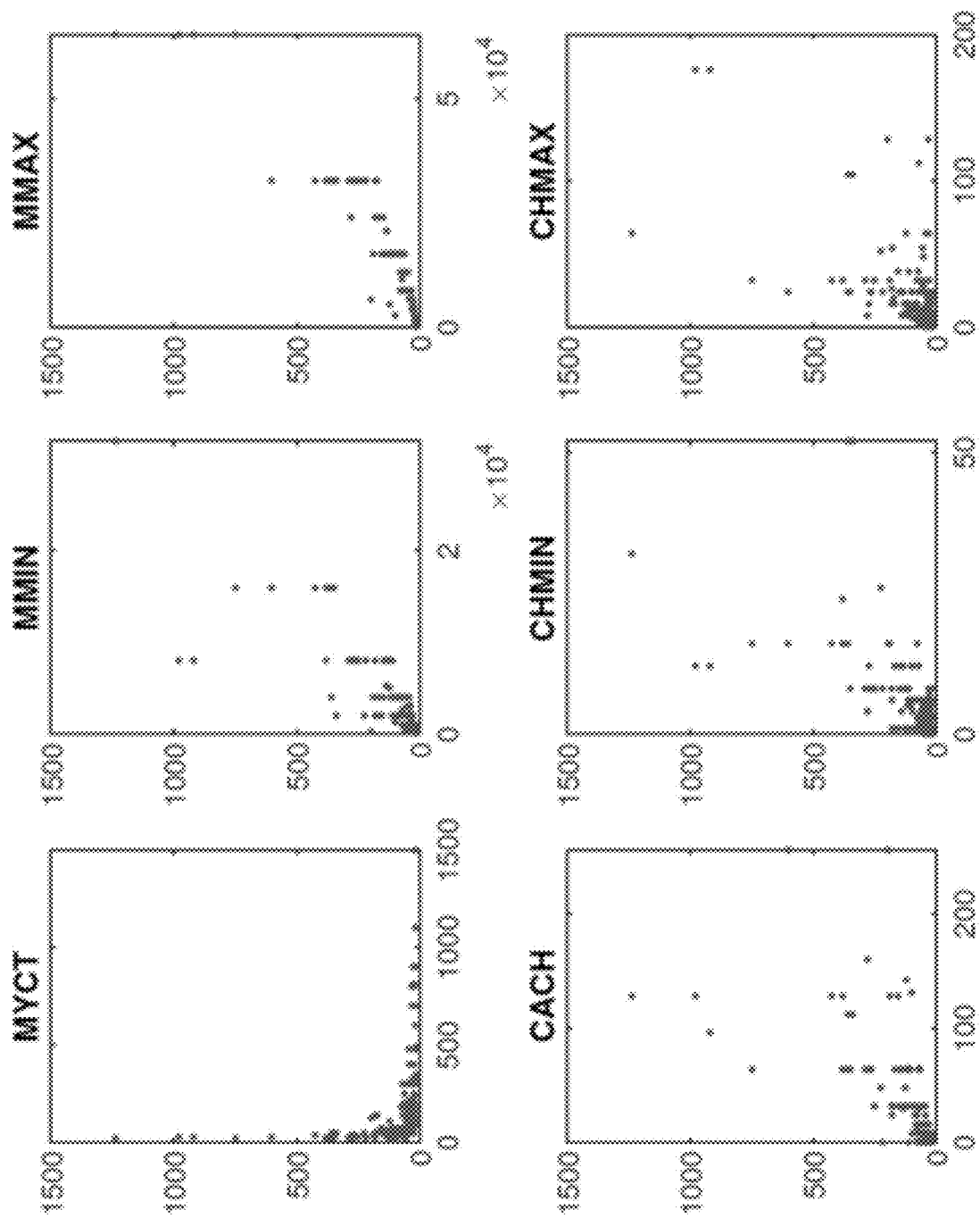
FIG. 10 illustrates a series of scatter plots for the CPU example described below.

FIG. 10 shows scatter plots for all six features in the CPU example. The threshold value for decision attribute "class"

is set to be 100, where around 25% of the attributes are 1 (>100) and the rest are −1 (≤100). From the scatter plot, one can see that for MYCT (machine cycle time in nanoseconds), the feature has a decreasing trend, while other features have an increasing trend.

Figure 11:
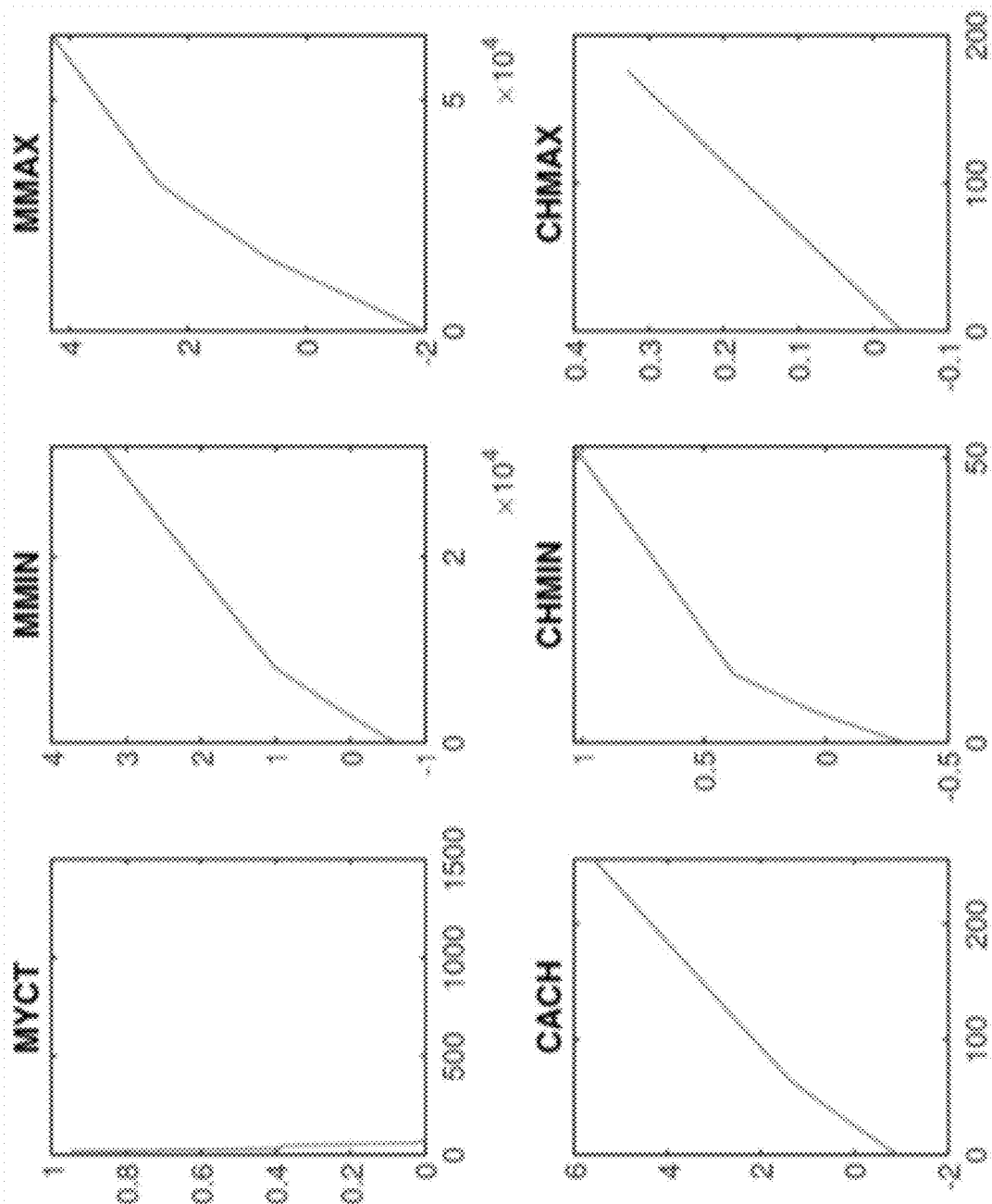
FIG. 11 illustrates a plot of marginal shape approximation functions for the features in the CPU example, as generated using an example SR-SVM as described herein.

FIG. 11 presents plots of marginal shape approximation functions $f_i(x_i)$ in the CPU example based on SR-SVM. For MYCT, the feature has a monotone decreasing shape, which is consistent with the trend in the scatter plot, and for CHMAX (maximum channels in units) it has a linear shape. For other four features, their shape types are concave increasing.

Table 4 presents the results of the SR-SVM and other classifiers as described above. It is noted that for the classification tree with Adaptive Boosting, 100 learning cycles are applied for each training dataset. For the datasets analyzed, one can find from Table 4 that most of the time, the SR-SVM classifier outperforms all the other classification methods (AutoMPG, CPU, WBC), or is very close to the best classifier (Pima, ERA, ESL, LEV, SWD) with respect to the average accuracy. The SR-SVM not only has better prediction accuracy over the standard SVM with linear or Gaussian kernels, it also performs better than the decision tree method, which is typically a non-linear classifier. The exception is the "Car" example where the SVM with Gaussian Kernel and decision tree methods performs better, and this result may be due to the interaction effects between input features. For other classifiers, the performance is close for most cases, with the one exception of OLM, which has a lower predicting accuracy as shown in the table; this may be due to the implementation that was used. When the OLM was implemented in WEKA, the default model specifications for classification were used.

be steeper when the value is less than 100, while the effect is more flattened when the feature is larger than 100. The SR-SVM solution also allows for increasing the number of knots to better fit the pattern of specific features. However, increasing the number of knots may require more computational burden, and may cause an overfitting issue for the data. Accordingly, as noted previously, 10 to 20 candidate knots for the algorithm to select is likely sufficient regarding classification accuracy.

Accordingly, the simulation study and the real data analysis supports the idea that adapting prior knowledge of shape information into a classifier can improve prediction accuracy and provide better insights to interpret the input features.

Classification problems in reality typically exhibit nonlinear effects from input features. The nonlinear effect may have complicated structures and variations. In this research, monotonicity, convexity, concavity, and the combination of these effects are primarily considered to create a classifier which is able to take the important shape information to enhance classification accuracy. Existing parametric classifiers (including linear classifiers) may not precisely capture the shape information, which yield potential non-intuitive predictions. The SR-SVM classifier accommodate the prior shape information from the data and, as such, provides better performance in terms of classification accuracy compared with other popular classifiers, including monotonic and nonlinear classifiers.

The proposed SR-SVM solution has the following three features. First, the SR-SVM classifier is solved via a non-parametric method. Given the shape information, the optimization algorithm automatically determines the knots where the non-linear curvature effects are required. The user can choose from either dense or sparse sets of knots to shape

TABLE 4

Classification performance in terms of the average accuracy and standard deviation (below, starting with ± ) of 0/1 loss.

| Data set | SR-SVM | SVM (Linear) | SVM (Gaussian) | Tree | Tree (AdaBoost) | PM-SVM | OLM |
|---|---|---|---|---|---|---|---|
| AutoMPG | 0.9208 ± 0.0423 | 0.9182 ± 0.0357 | 0.8926 ± 0.0481 | 0.8928 ± 0.0292 | 0.9029 ± 0.0427 | 0.9104 ± 0.0441 | 0.7964 ± 0.2519 |
| CPU | 0.9952 ± 0.0151 | 0.9810 ± 0.0402 | 0.9664 ± 0.0505 | 0.0926 ± 0.0438 | 0.9905 ± 0.0301 | 0.9857 ± 0.0321 | 0.8795 ± 0.1061 |
| Car | 0.8871 ± 0.0199 | 0.8866 ± 0.0179 | 0.9763 ± 0.0096 | 0.9792 ± 0.0103 | 0.9514 ± 0.0132 | 0.9693 ± 0.0086 | 0.7992 ± 0.2452 |
| Pima | 0.7735 ± 0.0428 | 0.7669 ± 0.0439 | 0.67071 ± 0.0579 | 0.7058 ± 0.0460 | 0.7566 ± 0.0294 | 0.7748 ± 0.0488 | 0.6080 ± 0.1901 |
| WBC | 0.9678 ± 0.0203 | 0.9664 ± 0.0206 | 0.9678 ± 0.0203 | 0.9267 ± 0.0354 | 0.9605 ± 0.0217 | 0.9605 ± 0.0274 | 0.9224 ± 0.2777 |
| ERA | 0.8140 ± 0.0477 | 0.8080 ± 0.0531 | 0.8104 ± 0.0493 | 0.8146 ± 0.0472 | 0.8129 ± 0.0512 | 0.8050 ± 0.0493 | 0.7470 ± 0.2267 |
| ESL | 0.9304 ± 0.0307 | 0.9181 ± 0.0471 | 0.9161 ± 0.0618 | 0.9161 ± 0.0573 | 0.9099 ± 0.0375 | 0.9324 ± 0.0304 | 0.4981 ± 0.1867 |
| LEV | 0.8590 ± 0.0533 | 0.8380 ± 0.0459 | 0.8590 ± 0.0409 | 0.8600 ± 0.0529 | 0.8590 ± 0.0491 | 0.8650 ± 0.0470 | 0.7770 ± 0.2365 |
| SWD | 0.7760 ± 0.0375 | 0.7740 ± 0.0334 | 0.7760 ± 0.0324 | 0.7830 ± 0.0267 | 0.7700 ± 0.0450 | 0.7730 ± 0.0368 | 0.6950 ± 0.2090 |

Best results stressed in boldface

Another advantage of the SR-SVM methodology is model interpretability. Since the proposed model can accommodate the non-linear relationship of the independent features, it is straightforward to check the monotonicity and convexity/concavity of the features by looking at the fitted marginal effect function $f_i(x_i)$. From the CPU example as shown in FIG. 11, one can not only find that the feature MYCT has a decreasing trend, but also see that this feature's effect would hyperplanes. A dense knot set is at the cost of more computing resource especially when the number of training objects or number of features is large. Second, the SR-SRM follows a convex optimization structure, as all available shapes are convex types of shapes. Therefore, it is essentially solving a convex optimization problem. And third, from another perspective, at each knot, the algorithm makes a "Yes" or "No" decision, with Yes indicating "jump/curve"

and No indicating "flatten out," so that it is also a high dimensional combinatorics problem.

Having described the underpinnings of the SR-SVM solution above, a series of operations will be described below in connection with a series of flowcharts in order to illustrate the training and use of an SR-SVM classifier using an example apparatus 200.

Example Operations

Figure 12:
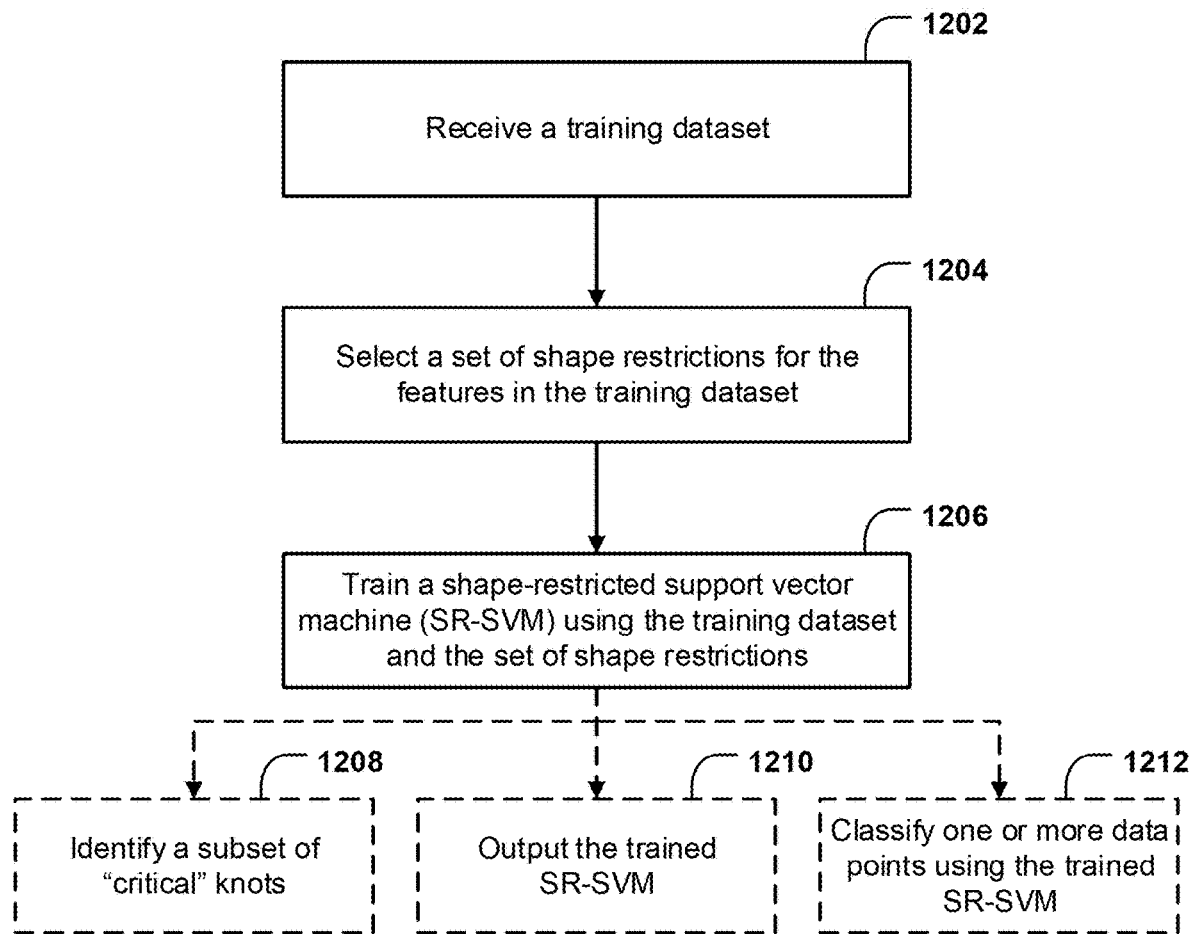
FIG. 12 illustrates an example flowchart for training an SR-SVM, in accordance with some example embodiments described herein.
Figures 13, 14:
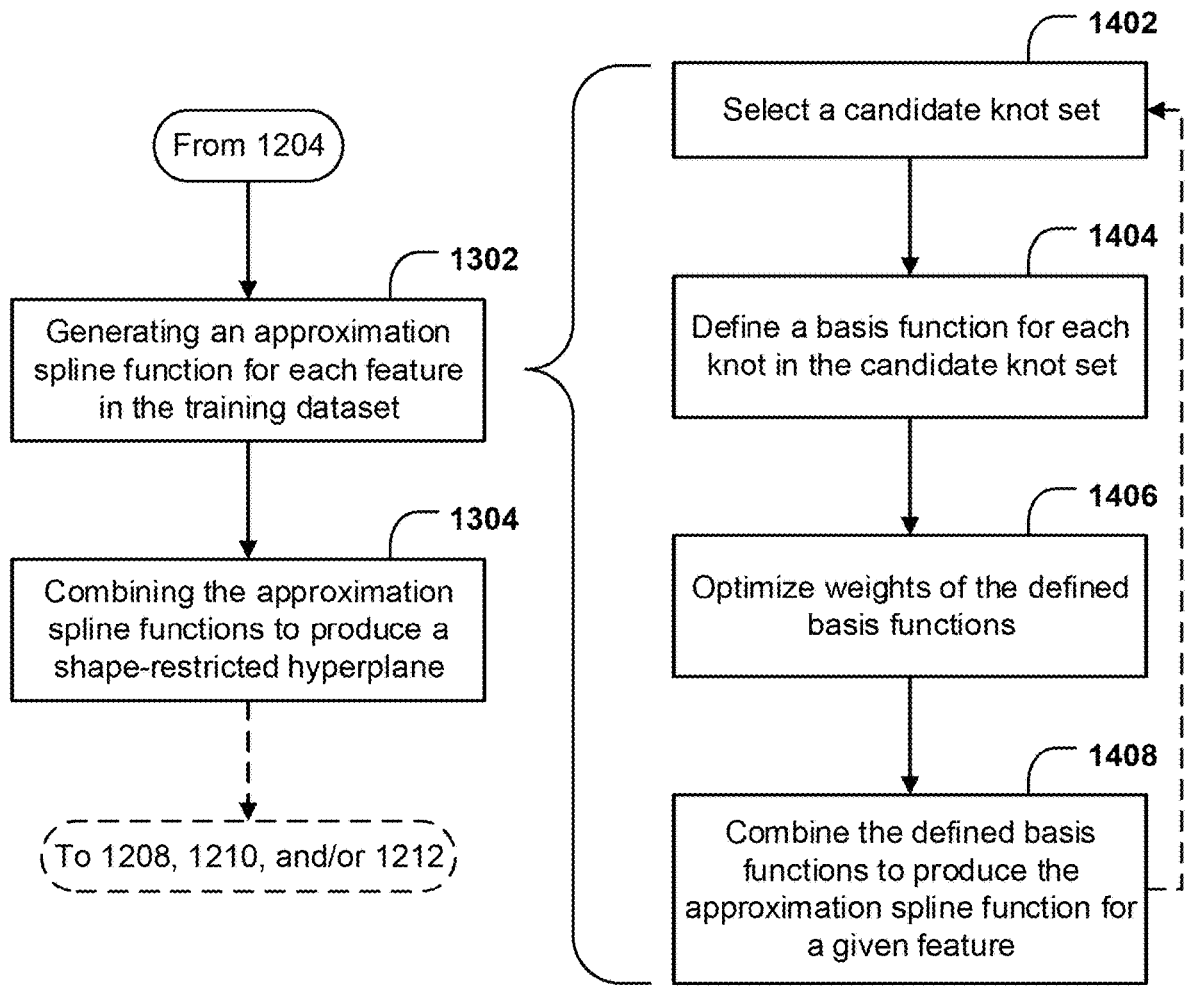
FIG. 13 illustrates an example flowchart for producing a shape-restricted hyperplane for a given SR-SVM, in accordance with some example embodiments described herein.
FIG. 14 illustrates another example flowchart for generating an approximation spline function for a particular feature, in accordance with some example embodiments described herein.

Turning to FIGS. 12-14, flowcharts are illustrated that contain example operations implemented by example embodiments described herein for training a SR-SVM. The operations illustrated in FIGS. 12-14 may, for example, be performed by the system device 102 shown in FIG. 1, which may in turn be embodied by an apparatus 200, which is shown and described in connection with FIG. 2. To perform the operations described below, the apparatus 200 may utilize one or more of processing circuitry 202, memory 204, input-output circuitry 206, communications circuitry 208, training engine 210, and/or any combination thereof. It will be understood that user interaction with the system device 102 may occur directly via input-output circuitry 208, or may instead be facilitated by a separate client device 108, as shown in FIG. 1, and which may have similar physical componentry facilitating such user interaction.

Turning first to FIG. 12, example operations are described below for training an SR-SVM. As shown by operation 1202, the apparatus 200 includes means, such as memory 204, input-output circuitry 206, communications circuitry 208, or the like, for receiving a training dataset. The training set may have previously been stored in a storage device 104 as set forth in FIG. 1, which may comprise memory 204 of the apparatus 200 or a remote storage device 104 accessible by the apparatus 200 using communications circuitry 208 or the like. In such cases, the training dataset may be retrieved by the apparatus 200 unilaterally. However, the training dataset may be received from a separate device with which a user interacts (e.g., one of client device 106A through client device 106N), in which case the training dataset may be received via communications circuitry 208. If the user interacts directly with the apparatus 200, the training dataset may be received via the input-output circuitry 206. The training dataset may comprise a series of data points, where each data point has a value for each known feature in the training dataset.

As shown by operation 1204, the apparatus 200 includes means, such as training engine 210 or the like, for selecting a set of shape restrictions for the features in the training dataset. As noted previously, training a SR-SVM utilizes shape-restriction information for each feature. Accordingly, the set of shape restrictions includes a shape restriction for each feature in the training dataset. The training engine 210 may select the set of shape restrictions in any number of ways. For instance, the user may provide, via input-output circuitry 208 of the apparatus 200 (or by a separate client device, and then relayed to the apparatus 200 via communications circuitry 206) input comprising a shape restriction selection for one or more of the features in the training dataset. Following receipt of any shape restriction selections, the training engine 210 may then select the set of shape restrictions to include the shape restriction selections provided by the user. However, the user may not provide shape restriction selection for any of the features in the training dataset. In such situations, the apparatus 200 may utilize a trial-and-error approach to identify shape-restriction information for one or more of the features in the training dataset. To this end, the training engine 210 may initially identify a linear shape restriction for every feature in the training dataset. Subsequently, the training engine 210 may generate an approximation spline function for the various features in the training dataset using a monotone increasing or decreasing shape restriction selection. Where the approximation spline function for a given feature is a flat line (e.g., having a slope of zero), that indicates that the assigned shape restriction is not the correct shape-restriction for the given feature, and the training engine 210 then selects the other monotone shape restriction for that feature and generates a new approximation spline function for the feature. If the new approximation spline function for the feature does not comprise a flat line, the training engine 210 selects additional convex or concave shape restriction to the monotone shape restriction of the feature and generates another new approximation spline function for the feature. This iterative process may occur until a shape restriction is selected for the feature such that the approximation spline function does not produce a flat line, at which point the then-current shape restriction for the feature is selected and used for training of the SR-SVM. This process may be performed by the training engine 210 for each feature in the training dataset to select the set of shape restrictions for the training dataset even in situations where there is no a priori knowledge of the shape restrictions for the training dataset.

As shown by operation 1206, the apparatus 200 includes means, such as training engine 210 or the like, for training the SR-SVM using the training dataset and the selected set of shape restrictions. Training the SR-SVM produces a shape-restricted hyperplane that defines a decision boundary separating a first class of data points in the training dataset from a second class of data points in the training dataset. Training the SR-SVM has been described in great detail above and is addressed below in connection with FIGS. 13 and 14.

Following training of an SR-SVM as set forth in operation 1206, the procedure may utilize the trained SR-SVM in any number of ways. To this end, the procedure may advance to one or more of operations 1208, 1210, or 1212, which are set forth below. Where the goal of the procedure is simply to train the SR-SVM, however, the procedure may end without advancing to any of these operations.

As shown by operation 1208, the apparatus 200 may include means, such as processing circuitry 202, memory 204, input-output circuitry 206, communications circuitry 208, training engine 210, or the like, for identifying a subset of the "critical" knots for the training dataset. In this regard, the "critical" knots comprise those knots for features in the training dataset that have the greatest impact on the contours of the shape-restricted hyperplane. As described previously in connection with the general concept of training an SR-SVM and in greater detail below in connection with FIG. 14, the apparatus 200 may generate an approximation spline function for each feature in the training dataset, and one aspect of that process involves selecting a number of candidate knot sets, and defining a basis function for each knot in the candidate knot set, and optimizing weights of the defined basis functions. Many of the candidate knots will produce basis functions whose optimized weights are zero. Basis functions having a zero weight do not contribute to the shape-restricted hyperplane. Accordingly, they are not "critical" knots. Alternatively, some basis functions have non-zero weights, and such knots are the "critical" knots for the feature and will impact the shape-restricted hyperplane comprising the decision boundary for the SR-SVM. Knowing which knots are "critical" (e.g., impact the classification of the training dataset) is important information because this information enables greater interpretability of the new data predictions, and moreover can be used to create other classification tools for modeling the training dataset (e.g., regression models).

As shown by operation 1210, the apparatus 200 may include means, such as input-output circuitry 206, communications circuitry 208, or the like, for outputting the trained SR-SVM. Outputting the trained SR-SVM may entail transmitting the shape-restricted hyperplane produced during training of the SR-SVM. As with the receipt of the training dataset at the outset of the procedure set forth in FIG. 12, the manner of outputting of the trained SR-SVM may depend on whether the user interacts directly with the apparatus 200 or interacts with the apparatus 200 via a separate client device. In the former case, input-output circuitry 208 may output the trained SR-SVM. In the latter case, the communications circuitry 206 may output the trained SR-SVM by transmitting it to the separate client device.

As shown by operation 1212, the apparatus 200 may include means, such as processing circuitry 202, memory 204, input-output circuitry 206, communications circuitry 208, training engine 210, or the like, for classifying one or more data points using the trained SR-SVM. To this end, the apparatus 200 may receive a target data point for classification via either input-output circuitry 206 or communications circuitry 208. Following receipt of the target data point, the processing circuitry 202 of the apparatus 200 may use the trained SR-SVM to classify the target data point into a first classification or a second classification. To do this, the shape-restricted hyperplane produced by training the SR-SVM may be used to determine the classification of the data point. Finally, the input-output circuitry 206 or communications circuitry 208 may output or otherwise return an indication of whether the target data point is in the first classification or the second classification. Of course, although operation 1212 describes classifying a single data point, it will be understood that operation 1212 may be utilized any number of times to classify any number of data points.

Turning next to FIG. 13, example operations will now be described for producing a shape-restricted hyperplane for a given SR-SVM. The operations illustrated in FIG. 13 may occur in place of operation 1206, described above in connection with FIG. 12. These operations may thus be carried out following the performance of operation 1204, as described above, and following performance of the operations described in connection with FIG. 13, the procedure may advance to operations 1208, 1210, or 1212, as described previously in connection with FIG. 12. Alternatively, where the goal of the procedure is simply to train the SR-SVM, the procedure may end without advancing to any of these operations.

As shown by operation 1302, the apparatus 200 includes means, such as training engine 210 or the like, for generating an approximation shape-restricted spline function for each feature in a training dataset. To do this, the training engine 210 may execute the procedure set forth in FIG. 14 for each feature in the training dataset.

As shown by operation 1304, the apparatus 200 includes means, such as training engine 210 or the like, for combining the approximation spline functions generated in operation 502 to produce a shape-restricted hyperplane. As set forth in Equation 8 previously, combining the approximation spline functions may comprise a sum of the various spline functions $f_i(x_i)$ plus a coefficient $\beta_0$.

Turning finally to FIG. 14, example operations will now be described for generating an approximation spline function for a particular feature of a training dataset. Although FIG. 14 illustrates a detailed set of operations for generating a particular approximation spline function for a particular feature, it will be understood that operation 1302 shown in FIG. 13 may initiate this sequence of operations for each feature of a given training data, such that the spline functions can be combined as set forth previously.

As shown by operation 1402, the apparatus 200 includes means, such as training engine 210 or the like, for selecting a candidate knot set. The candidate knot set can be selected in a number of ways. For instance, a specific number of quantiles may be predefined by the training engine 210 for use as candidate knots during the training process. Where no candidate knots are provided by user input, this predefined number of quantiles may then be utilized to generate the candidate knot set, as set forth previously. For instance, where the predefined number of quantiles is 10, the training engine 210 may select the candidate knots as points for the particular feature at percentile inputs in the training dataset in line with the predefined number of quantiles.

Another way to select the candidate knot set is via user input may of a particular number of quantiles to be utilized to generate the candidate knot set. In this fashion, rather than defaulting to the predefined number of knots set by the training engine 210, the user may select a desired number of knots to use for the candidate knot set. However, the process for identifying the candidate knots for candidate knot set remains the same as when using the predefined number of quantiles, except that the training engine 210 selects the candidate knots as points for the particular feature at percentile inputs in line with the user input.

Still another way to select the candidate knot set is via user input of knot locations. To this end, the user may submit (and the apparatus 200 may receive, via input-output circuitry 208 or communications circuitry 206, as appropriate), a set of user-specified knot locations. Subsequently, the training engine 210 simply utilizes the user-specified knot locations as the candidate knots during the training procedure.

As shown by operation 1404, the apparatus 200 includes means, such as training engine 210 or the like, for defining a basis function for each knot in the candidate knot set. To this end, the training engine 210 may define the basis function for each knot based on the shape restriction for the particular feature that was previously selected in operation 1204, and described previously.

As shown by operation 1406, the apparatus 200 includes means, such as training engine 210 or the like, for optimizing the weights of the basis functions defined in operation 1404 above. Optimizing the weights of the basis functions may utilize an active-set algorithm, which is described in greater detail above. It will be understood that optimizing the weights of the basis functions may produce a number of basis functions whose optimized weight is zero. A basis function whose optimized weight is zero has no impact on the contour of the shape-restricted hyperplane produced by training the SR-SVM. Accordingly, as addressed previously in connection with operation 1208 of FIG. 12, the training engine 210 may identify the subset of knots that correspond to basis functions whose optimized weights are non-zero, because this subset of knots comprises the "critical" knots that will impact the contours of the shape-restricted hyperplane.

Finally, as shown by operation 1408, the apparatus 200 includes means, such as training engine 210 or the like, for combining the defined basis functions to produce the approximation spline function for a given feature. A procedure for combining the defined basis functions is set forth in Equation 10, above. It will be understood, as noted previously, that an approximation spline function will be generated for each feature of the training data, which mail require the training engine 210 to perform of the procedure set forth in FIG. 14 multiple times to generate the appropriate number of spline functions. That this procedure may be repeated a number of times is reflected in FIG. 14 by the dotted arrow from operation 1408 back to operation 1402.

As described above, example embodiments provide methods and apparatuses that enable improved classification through training and utilization of a SR-SVM. As described above, utilization of an SR-SVM classifier increases classification accuracy over traditional classification tools by taking into account shape constraints between particular features and training data. Moreover, the SR-SVM provides additional insight into the data being modeled, by revealing more specific information regarding the relationship between the various features in the data and the decision boundary produced by training the SR-SVM. Furthermore, the greater insight provided through training the SR-SVM also offers greater interpretability of the SR-SVM model than provided by traditional classification approaches. Overall, the example embodiments contemplated herein illustrate that training and utilization of an SR-SVM provides technical solutions that address real-world classification problems, and offer practical insights that can be leveraged in production environments even in more heavily scrutinized modeling domains where interpretability is of paramount importance.

FIGS. 12, 13, and 14 illustrate flowcharts describing operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for data classification using a shape-restricted support vector machine (SR-SVM), the method comprising:
    receiving a training dataset;
    selecting, by a training engine, a set of shape restrictions, the set of shape restrictions including a shape restriction for each feature in the training dataset, wherein selecting the set of shape restrictions comprises:
        identifying, by the training engine, a first set of shape restrictions, the first set of shape restrictions including a shape restriction for each feature in the training dataset, and
        for a particular feature in the training dataset,
            generating an approximation spline function based on the shape restriction for the particular feature in the first set of shape restrictions; and
            in an instance in which the approximation spline function has a slope of zero, replacing the shape restriction for the particular feature in the first set of shape restrictions with a different shape restriction for the particular feature;
    training, by the training engine, the SR-SVM using the training dataset and the selected set of shape restrictions, wherein training the SR-SVM produces a shape-restricted hyperplane that defines a decision boundary separating a first class of data points in the training dataset from a second class of data points in the training dataset;

receiving a target data point;
using the trained SR-SVM to classify the target data point into a first classification or a second classification; and
outputting an indication of whether the target data point is in the first classification or the second classification.

2. The method of claim 1, wherein selecting the set of shape restrictions comprises:
receiving, by input-output circuitry, user input comprising a shape restriction selection for a feature in the training dataset; and
selecting, by the training engine, the set of shape restrictions based on the received user input.

3. The method of claim 1, wherein training the SR-SVM includes:
generating an approximation spline function for each feature in the training dataset based on the shape restriction for the feature in the set of shape restrictions; and
combining the approximation spline functions generated for the features in the training dataset plus a coefficient to produce the shape-restricted hyperplane.

4. The method of claim 3, wherein generating an approximation spline function for a particular feature includes:
selecting a candidate knot set;
defining, based on the shape restriction for the particular feature in the set of shape restrictions, a basis function for each knot in the candidate knot set;
optimizing weights of the defined basis functions; and
combining the defined basis functions to produce an approximation spline function for the particular feature.

5. The method of claim 4, wherein selecting the candidate knot set includes:
identifying a predefined number of quantiles; and
selecting the candidate knot set based on the predefined number of quantiles.

6. The method of claim 4, wherein selecting the candidate knot set includes:
receiving, by an input device, a number of quantiles to be used for knot selection; and
selecting the candidate knot set based on the received number of quantiles.

7. The method of claim 4, wherein selecting the candidate knot set includes:
receiving a set of user-specified knot locations,
wherein the candidate knot set comprises the set of user-specified knot locations.

8. The method of claim 4, wherein optimizing weights of the defined basis functions utilizes an active-set optimization algorithm.

9. The method of claim 8, further comprising:
identifying a subset of knots from the candidate knot set that correspond to defined basis functions whose optimized weights are non-zero.

10. The method of claim 1, further comprising:
outputting the trained SR-SVM.

11. An apparatus for data classification using a shape-restricted support vector machine (SR-SVM), the apparatus comprising:
input-output circuitry configured to
receive a training dataset; and
a training engine configured to:
select a set of shape restrictions, the set of shape restrictions including a shape restriction for each feature in the training dataset, wherein the selection of a set of shape restriction comprises:
identifying, by the training engine, a first set of shape restrictions, the first set of shape restrictions including a shape restriction for each feature in the training dataset, and for a particular feature in the training dataset,
generating an approximation spline function based on the shape restriction for the particular feature in the first set of shape restrictions; and
in an instance in which the approximation spline function has a slope of zero, replacing the shape restriction for the particular feature in the first set of shape restrictions with a different shape restriction for the particular feature, and
train the SR-SVM using the training dataset and the selected set of shape restrictions,
wherein training the SR-SVM produces a shape-restricted hyperplane that defines a decision boundary separating a first class of data points in the training dataset from a second class of data points in the training dataset,
wherein the input-output circuitry is further configured to receive a target data point,
wherein the apparatus further includes:
processing circuitry configured to use the trained SR-SVM to classify the target data point into a first classification or a second classification; and
communications circuitry configured to output an indication of whether the target data point is in the first classification or the second classification.

12. The apparatus of claim 11, wherein the training engine is configured to train the SR-SVM by:
generating an approximation spline function for each feature in the training dataset based on the shape restriction for the feature in the set of shape restrictions; and
combining the approximation spline functions generated for the features in the training dataset plus a coefficient to produce the shape-restricted hyperplane.

13. The apparatus of claim 12, wherein the training engine is configured to generate an approximation spline function for a particular feature by:
selecting a candidate knot set;
defining, based on the shape restriction for the particular feature in the set of shape restrictions, a basis function for each knot in the candidate knot set;
optimizing weights of the defined basis functions; and
combining the defined basis functions to produce an approximation spline function for the particular feature.

14. The apparatus of claim 13, wherein the training engine is configured to optimize weights of the defined basis functions using an active-set optimization algorithm.

15. The apparatus of claim 14, wherein the training engine is configured to identify a subset of knots from the candidate knot set that correspond to defined basis functions whose optimized weights are non-zero.

16. The apparatus of claim 11, further comprising the communications circuitry configured to output the trained SR-SVM.

17. A computer program product for data classification using a SR-SVM, the computer program product comprising at least one non-transitory computer-readable storage medium storing software instructions that, when executed, cause an apparatus to:
receive a training dataset;
select a set of shape restrictions, the set of shape restrictions including a shape restriction for each feature in the training dataset, wherein the apparatus is configured to select the set of shape restrictions by:

identifying a first set of shape restrictions, the first set of shape restrictions including a shape restriction for each feature in the training dataset, and for a particular feature in the training dataset,
- generating an approximation spline function based on the shape restriction for the particular feature in the first set of shape restrictions, and
- in an instance in which the approximation spline function has a slope of zero, replacing the shape restriction for the particular feature in the first set of shape restrictions with a different shape restriction for the particular feature;

train the SR-SVM using the training dataset and the selected set of shape restrictions, wherein training the SR-SVM produces a shape-restricted hyperplane that defines a decision boundary separating a first class of data points in the training dataset from a second class of data points in the training dataset;

receive a target data point;

use the trained SR-SVM to classify the target data point into a first classification or a second classification; and output an indication of whether the target data point is in the first classification or the second classification.

18. The apparatus of claim 13, wherein the training engine is configured to select the candidate knot set by:

identifying a predefined number of quantiles; and selecting the candidate knot set based on the predefined number of quantiles.

\* \* \* \* \*